(12) United States Patent
Ma et al.

(10) Patent No.: US 12,468,329 B2
(45) Date of Patent: Nov. 11, 2025

(54) ELECTRONIC DEVICE CONTROLLING CPU CLOCK, METHOD FOR OPERATING SAME, AND STORAGE MEDIUM

(71) Applicant: SAMSUNG ELECTRONICS CO., LTD., Suwon-si (KR)

(72) Inventors: Dongchul Ma, Suwon-si (KR); Daekyung Kim, Suwon-si (KR); Dongwook Kim, Suwon-si (KR); Byungki Moon, Suwon-si (KR); Sungbo Park, Suwon-si (KR); Dongil Son, Suwon-si (KR); Hwayoung Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 18/221,226

(22) Filed: Jul. 12, 2023

(65) Prior Publication Data
US 2024/0019890 A1 Jan. 18, 2024

Related U.S. Application Data

(63) Continuation of application No. PCT/KR2023/009980, filed on Jul. 12, 2023.

(30) Foreign Application Priority Data

Jul. 12, 2022 (KR) .................. 10-2022-0085665
Aug. 16, 2022 (KR) .................. 10-2022-0102186

(51) Int. Cl.
*G06F 1/08* (2006.01)
(52) U.S. Cl.
CPC .................. *G06F 1/08* (2013.01)

(58) Field of Classification Search
CPC .................. G06F 1/08; G06F 9/50
See application file for complete search history.

(56) References Cited

U.S. PATENT DOCUMENTS

| | | | |
|---|---|---|---|
| 10,275,007 B2 | 4/2019 | Buhot et al. | |
| 2013/0329637 A1* | 12/2013 | Kodali | H04W 76/27 370/328 |

(Continued)

FOREIGN PATENT DOCUMENTS

| | | | |
|---|---|---|---|
| CN | 108304262 A | * | 7/2018 |
| EP | 3 923 208 A1 | | 12/2021 |

(Continued)

OTHER PUBLICATIONS

Wang, Farul et al., "Dynamic GPU Energy Optimization for Machine Learning Training Workloads", arXiv:2201.01684v1 [cs.DC], Jan. 5, 2022. (13 pages total).

(Continued)

*Primary Examiner* — Hyun Soo Kim
(74) *Attorney, Agent, or Firm* — Sughrue Mion, PLLC

(57) ABSTRACT

According to an embodiment, an electronic device may include at least one communication processor comprising at least one central processing unit (CPU). According to an embodiment, the at least one communication processor may be configured to enter an RRC_Connected state. According to an embodiment, the at least one communication processor may be configured to control a clock level for the at least one CPU to be a first CPU clock level corresponding to the RRC_Connected state. According to an embodiment, the at least one communication processor may be configured to identify workload information comprising at least one of utilization information of the at least one CPU and traffic information of at least one bus of the at least one communication processor. According to an embodiment, the at least one communication processor may be configured provide (Continued)

the workload information as an input to an artificial intelligence (AI) model, wherein the AI model is trained using training data comprising at least one of CPU utilization information and bus traffic information as input values and CPU clock levels as output values. According to an embodiment, the at least one communication processor may be configured to identify, based on the providing the workload information as the input to the AI model, a second CPU clock level as an output of the AI model. Various other embodiments may be possible.

18 Claims, 16 Drawing Sheets

(56) References Cited

U.S. PATENT DOCUMENTS

| | | |
|---|---|---|
| 2016/0050111 A1 | 2/2016 | Jang et al. |
| 2016/0116954 A1 | 4/2016 | Zhuang et al. |
| 2019/0272002 A1* | 9/2019 | Seenappa ............... G06F 1/324 |
| 2021/0081016 A1* | 3/2021 | Hovis .................... G06F 1/3206 |
| 2021/0157639 A1 | 5/2021 | Nijasure et al. |
| 2021/0389989 A1 | 12/2021 | Farre Guiu et al. |
| 2022/0342719 A1 | 10/2022 | Garcia-Saavedra et al. |
| 2024/0019923 A1* | 1/2024 | Willis .................... G06F 1/324 |
| 2024/0094796 A1* | 3/2024 | Narayanaswamy .... G06F 1/206 |

FOREIGN PATENT DOCUMENTS

| | | | |
|---|---|---|---|
| JP | 2003007830 A | * | 1/2003 |
| JP | 2004-280216 A | | 10/2004 |
| JP | 2006-268246 A | | 10/2006 |
| JP | 2011-39836 A | | 2/2011 |
| KR | 10-2016-0019824 A | | 2/2016 |
| KR | 10-1666549 B1 | | 10/2016 |
| KR | 10-2213673 B1 | | 2/2021 |
| KR | 10-2022-0104722 A | | 7/2022 |
| KR | 10-2023-0069490 A | | 5/2023 |
| WO | 2021/089114 | | 5/2021 |

OTHER PUBLICATIONS

Liu, Jie et al., "Performance Analysis and Characterization of Training Deep Learning Models on Mobile Devices", arXiv:1906.04278v2 [cs.LG], Sep. 7, 2019. (12 pages total).

International Search Report (PCT/ISA/210) issued Oct. 16, 2023 by the International Searching Authority in International Patent Application No. PCT/KR2023/009980.

Written Opinion (PCT/ISA/237) issued Oct. 16, 2023 by the International Searching Authority in International Patent Application No. PCT/KR2023/009980.

* cited by examiner

ELECTRONIC DEVICE CONTROLLING CPU CLOCK, METHOD FOR OPERATING SAME, AND STORAGE MEDIUM

CROSS-REFERENCE TO RELATED APPLICATION

This application is a bypass continuation application of International Application No. PCT/KR2023/009980, filed on Jul. 12, 2023, which is based on and claims the benefit of a Korean Patent Application No. 10-2022-0085665, filed on Jul. 12, 2022, in the Korean Intellectual Property Office, and to a Korean Patent Application No. 10-2022-0102186, filed on Aug. 16, 2022, in the Korean Intellectual Property Office, the disclosures of each of which are incorporated by reference herein in their entireties.

BACKGROUND

1. Field

The disclosure relates to an electronic device for controlling a central processing unit (CPU) clock, an operation method thereof, and a storage medium, and relates, more particularly, to an electronic device for controlling at least one CPU clock included in a communication processor of the electronic device, an operation method thereof, and a storage medium

2. Description of Related Art

A processor of an electronic device, for example, a communication processor, may include at least one CPU. At least one CPU may process at least one process for communication of the electronic device. At least one CPU may operate based on dynamic voltage and frequency scaling (DVFS). DVFS is a technology for dynamically adjusting the voltage applied to a CPU core and/or a CPU clock. For example, when a relatively large number of processes are to be processed by at least one CPU and/or when a relatively large amount of process is provided, a relatively high CPU clock may be provided depending on DVFS. On the other hand, when a relatively small number of processes are to be processed by at least one CPU and/or when a relatively small amount of process is provided, a relatively low CPU clock may be provided depending on DVFS. As the CPU clock is adjusted based on the number of processes and/or the amount of process, power consumption may be reduced and/or heat generation may be reduced.

The use of a high communication frequency band and an increase in data throughput of the electronic device may increase current consumption of the electronic device and heat generation thereof. Accordingly, it is possible to reduce current consumption and/or heat generation of the electronic device by performing clock control of at least one CPU, based on DVFS.

SUMMARY

According to an aspect of the disclosure, an electronic device includes: at least one communication processor including at least one central processing unit (CPU), wherein the at least one communication processor is configured to: enter an RRC_Connected state; control a clock level for the at least one CPU to be a first CPU clock level corresponding to the RRC_Connected state; identify workload information comprising at least one of utilization information of the at least one CPU and traffic information of at least one bus of the at least one communication processor; provide the workload information as an input to an artificial intelligence (AI) model, wherein the AI model is trained using training data comprising at least one of CPU utilization information and bus traffic information as input values and CPU clock levels as output values; identify, based on the providing the workload information as the input to the AI model, a second CPU clock level as an output of the AI model; and change the clock level for the at least one CPU from the first CPU clock level to the second CPU clock level.

The utilization information of the at least one CPU may include utilization information of a first part of the at least one CPU.

The first part of the at least one CPU may include a CPU configured to be consistently turned on independent of an operation of the at least one communication processor.

The traffic information of the at least one bus of the at least one communication processor may include at least one of traffic information of a CPU bus of the at least one communication processor, traffic information of a data bus of the at least one communication processor, and traffic information of a DMA bus of the at least one communication processor.

The at least one communication processor may be further configured to: identify a throughput of the electronic device, and identify the first CPU clock level based on the identified throughput.

The at least one communication processor may be further configured to select the AI model based on at least one of a state of the at least one communication processor and a state of the electronic device.

The at least one communication processor may be further configured to identify the second CPU clock level as the output of the AI model based on a state of the at least one communication processor or a state of the electronic device satisfying an AI model application condition.

The AI model application condition may include a measurement value of at least one piece of hardware of the electronic device or execution of an application by the electronic device.

The at least one communication processor may be further configured to: based on the state of the at least one communication processor or the state of the electronic device not satisfying the AI model application condition, maintain the first CPU clock level.

According to an aspect of the disclosure, a method of operating an electronic device includes: entering an RRC_Connected state; controlling a clock level for at least one central processing unit (CPU) included in at least one communication processor of the electronic device to be a first CPU clock level corresponding to the RRC_Connected state; identifying workload information comprising at least one of utilization information of the at least one CPU and traffic information of at least one bus of the at least one communication processor; providing the workload information as an input to an artificial intelligence (AI) model, wherein the AI model is trained using training data comprising at least one of CPU utilization information and bus traffic information as input values and CPU clock levels as output values; identifying, based on the providing the workload information as the input to the AI model, a second CPU clock level as an output of the AI model; and changing the clock level for the at least one CPU from the first CPU clock level to the second CPU clock level.

The utilization information of the at least one CPU may include utilization information of a first part of the at least one CPU.

The first part of the at least one CPU may include a CPU configured to be consistently turned on independent of an operation of the at least one communication processor.

The traffic information of the at least one bus of the at least one communication processor may include traffic information of a CPU bus of the at least one communication processor, traffic information of a data bus of the at least one communication processor, and traffic information of a DMA bus of the at least one communication processor.

The method may further include: identifying a throughput of the electronic device; and identifying the first CPU clock level based on the identified throughput.

The method may further include selecting the AI model based on at least one of a state of the at least one communication processor and a state of the electronic device.

The identifying the second CPU clock level may further include identifying the second CPU clock level as the output of the AI model based on a state of the at least one communication processor or a state of the electronic device satisfying an AI model application condition.

The AI model application condition may include a measurement value of at least one piece of hardware of the electronic device or execution of an application by the electronic device.

The method may further include: based on the state of the at least one communication processor or the state of the electronic device not satisfying the AI model application condition, maintaining the first CPU clock level.

According to an aspect of the disclosure, a non-transitory computer readable medium having instructions stored therein, which when executed by at least one communication processor of an electronic device, cause the at least one communication processor to execute a method of operating the electronic device, the method including: entering an RRC_Connected state; controlling a clock level for at least one central processing unit (CPU) included in at least one communication processor of the electronic device to be a first CPU clock level corresponding to the RRC_Connected state; identifying workload information comprising at least one of utilization information of the at least one CPU and traffic information of at least one bus of the at least one communication processor; providing the workload information as an input to an artificial intelligence (AI) model, wherein the AI model is trained using training data comprising at least one of CPU utilization information and bus traffic information as input values and CPU clock levels as output values; identifying, based on the providing the workload information as the input to the AI model, a second CPU clock level as an output of the AI model; and changing the clock level for the at least one CPU from the first CPU clock level to the second CPU clock level.

The utilization information of the at least one CPU comprises utilization information of a first part of the at least one CPU.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
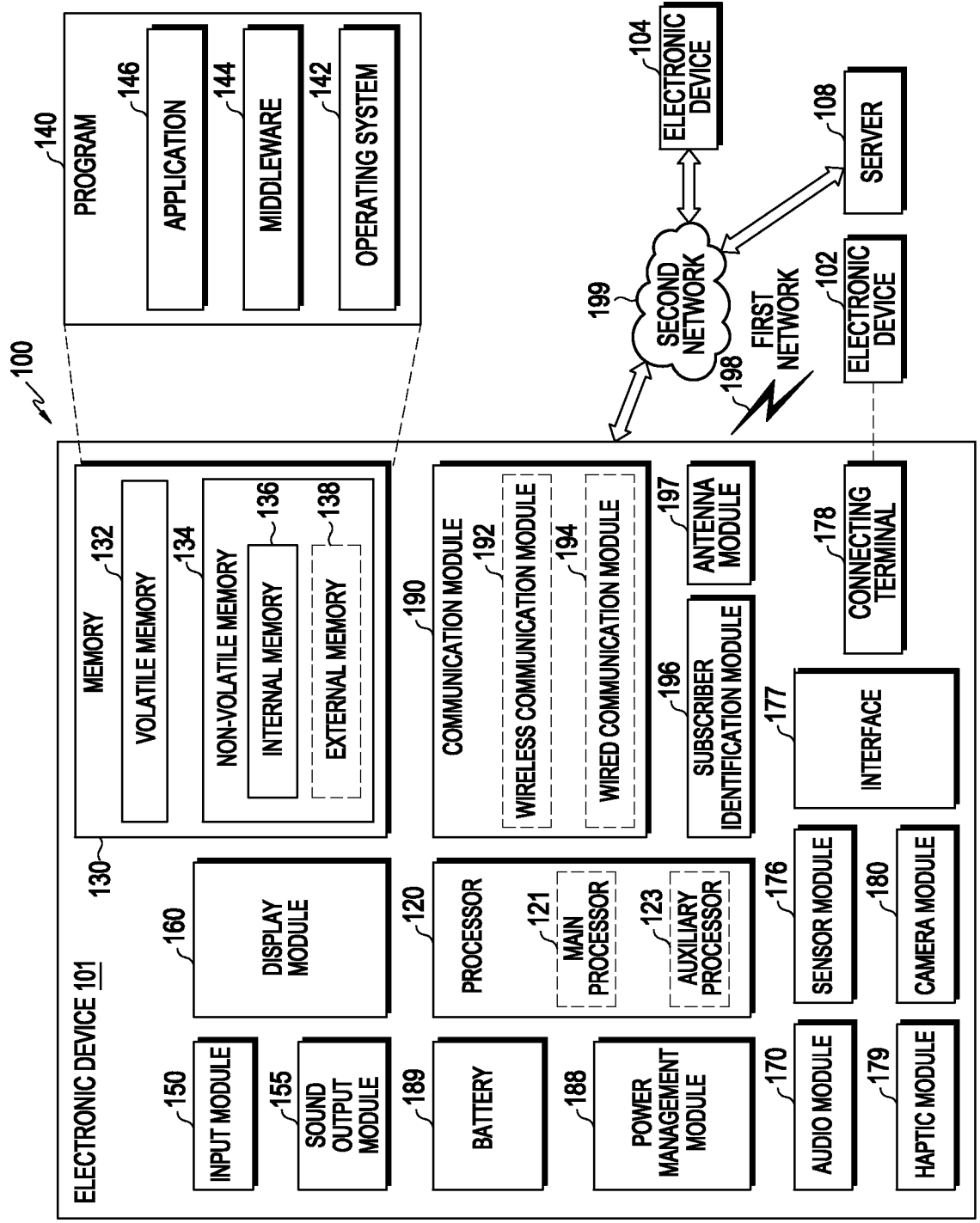
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is executed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
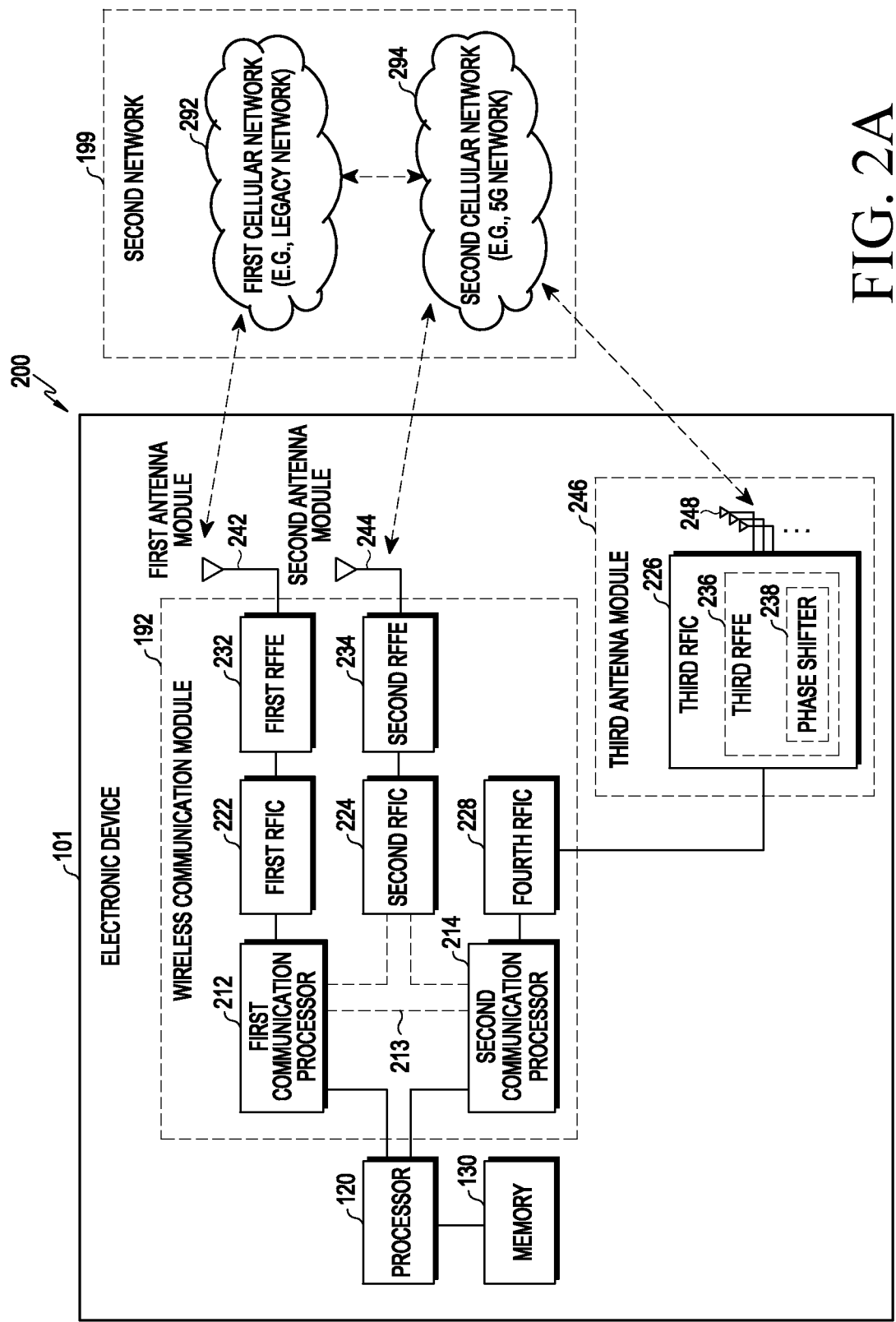
FIG. 2A is a block diagram of an electronic device for supporting legacy network communication and 5G network communication according to an embodiment.

FIG. 2A is a block diagram 200 of an electronic device 101 for supporting legacy network communication and 5G network communication according to an embodiment. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be excluded or included as a part of the third RFIC 226.

The first communication processor 212 may support establishment of a communication channel in a band to be used for wireless communication with the first cellular network 292 and legacy network communication through the established communication channel. According to an embodiment, the first cellular network may be a legacy network including a second generation (2G), 3G, 4G, or long-term evolution (LTE) network. The second communication processor 214 may support establishment of a communication channel corresponding to a designated band (e.g., about 6 GHz to about 60 GHz) among the bands to be used for wireless communication with the second cellular network 294 and 5G network communication through the established communication channel. According to an embodiment, the second cellular network 294 may be a 5G network defined by 3GPP. Additionally, according to an embodiment, the first communication processor 212 or the second communication processor 214 may support establishment of a communication channel corresponding to another designated band (e.g., about 6 GHz or less) among the bands to be used for wireless communication with the second cellular network 294 and 5G network communication through the established communication channel.

The first communication processor 212 may transmit and receive data to and from the second communication processor 214. For example, data classified as being transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an inter-processor interface 213. The inter-processor interface 213 may be implemented as, for example, a universal asynchronous receiver/transmitter (UART) (e.g., a high speed-UART (HS-UART)) or a peripheral component interconnect bus express (PCIe) interface, but the type thereof is not limited. Alternatively, the first communication processor 212 and the second communication processor 214 may exchange control information and packet data information using, for example, a shared memory. The first communication processor 212 may transmit and receive a variety of information such as sensing information, information about output intensity, and resource block (RB) allocation information to and from the second communication processor 214.

Depending on implementation, the first communication processor 212 may not be directly connected to the second communication processor 214. In this case, the first communication processor 212 may transmit and receive data to and from the second communication processor 214 through the processor 120 (e.g., an application processor). For example, the first communication processor 212 and the second communication processor 214 may transmit and receive data to and from each other through the processor 120 (e.g., an application processor) and an HS-UART interface or a PCIe interface, but the type of interface is not limited. Alternatively, the first communication processor 212 and the second communication processor 214 may exchange control information and packet data information using the processor 120 (e.g., an application processor) and a shared memory.

Figure 2B:
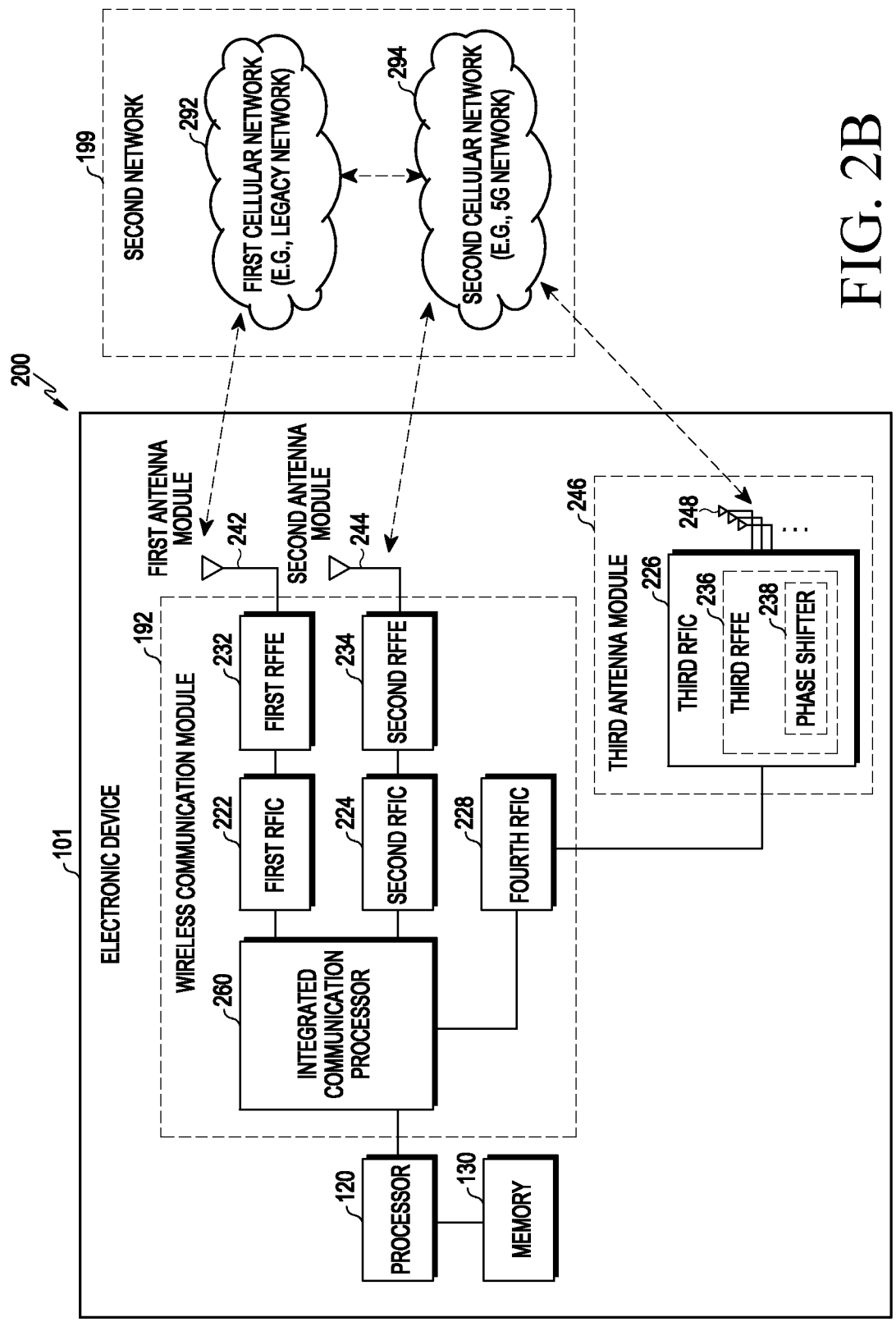
FIG. 2B is a block diagram of an electronic device for supporting legacy network communication and 5G network communication according to an embodiment.

According to an embodiment, the first communication processor 212 and the second communication processor 214 may be implemented in a single chip or a single package. According to an embodiment, the first communication processor 212 or the second communication processor 214 may be formed in a single chip or single package with the processor 120, the co-processor 123, or the communication module 190. For example, as shown in FIG. 2B, the communication processor 260 may support all functions for communication with the first cellular network 292 and the second cellular network 294.

In the case of transmission, the first RFIC 222 may convert a baseband signal generated by the first communication processor 212 into a radio frequency (RF) signal of about 700 MHz to 3 GHz used in the first cellular network 292 (e.g., a legacy network). In the case of reception, an RF signal may be obtained from the first network 292 (e.g., a legacy network) through an antenna (e.g., the first antenna module 242) and preprocessed by the RFFE (e.g., the first RFFE 232). The first RFIC 222 may convert the preprocessed RF signal into a baseband signal to be processed by the first communication processor 212.

In the case of transmission, the second RFIC 224 may convert a baseband signal generated by the first communication processor 212 or the second communication processor 214 into an RF signal in a Sub6 band (e.g., about 6 GHz or less) (hereinafter referred to as a 5G Sub6 RF signal) to be used in the second cellular network 294 (e.g., a 5G network). In the case of reception, a 5G Sub6 RF signal may be obtained from the second cellular network 294 (e.g., a 5G network) through an antenna (e.g., the second antenna module 244) and preprocessed by the RFFE (e.g., the second RFFE 234). The second RFIC 224 may convert the preprocessed 5G Sub6 RF signal into a baseband signal to be processed by a corresponding communication processor among the first communication processor 212 and the second communication processor 214.

The third RFIC 226 may convert a baseband signal generated by the second communication processor 214 into an RF signal in a 5G Above6 band (e.g., about 6 GHz to about 60 GHz) (hereinafter referred to as a 5G Above6 RF signal) to be used in the second cellular network 294 (e.g., a 5G network). In the case of reception, a 5G Above6 RF signal may be obtained from the second cellular network 294 (e.g., a 5G network) through an antenna (e.g., the antenna 248) and preprocessed by a third RFFE 236. The third RFIC 226 may convert the preprocessed 5G Above6 RF signal into a baseband signal to be processed by the second communication processor 214. According to an embodiment, the third RFFE 236 may be formed as part of the third RFIC 226.

The electronic device 101, according to an embodiment, may include a fourth RFIC 228 separately from the third RFIC 226 or at least as part thereof. In this case, the fourth RFIC 228 may convert a baseband signal generated by the second communication processor 214 into an RF signal (hereinafter, an IF signal) in an intermediate frequency band (e.g., about 9 GHz to about 11 GHz) and transmit the IF signal to the third RFIC 226. The third RFIC 226 may convert the IF signal into a 5G Above6 RF signal. In the case of reception, a 5G Above6 RF signal may be received from the second cellular network 294 (e.g., a 5G network) through an antenna (e.g., the antenna 248) and converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least part of a single chip or single package. According to an embodiment, in the case where the first RFIC 222 and the second RFIC 224 are implemented as a single chip or a single package in FIG. 2A or 2B, they may be implemented as an integrated RFIC. In this case, the integrated RFIC may be connected to the first RFFE 232 and the second RFFE 234 to convert a baseband signal into a signal in a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or combined with another antenna module to process RF signals in a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed on a partial area (e.g., a lower surface) of a second substrate (e.g., a sub-PCB) separate from the first substrate, and the antenna 248 may be disposed on another partial area (e.g., an upper surface) so that the third antenna module 246 may be formed. By arranging the third RFIC 226 and the antenna 248 on the same substrate, it is possible to reduce the length of a transmission line therebetween. This may reduce loss (e.g., attenuation) of a signal in a high frequency band (e.g., about 6 GHz to about 60 GHz) used in, for example, 5G network communication due to a transmission line. As a result, the electronic device 101 may improve the quality or speed of communication with the second network 294 (e.g., a 5G network).

According to an embodiment, the antenna 248 may be formed as an antenna array including a plurality of antenna elements capable of being used in beamforming. In this case, the third RFIC 226 may include, for example, a plurality of phase shifters 238, as a part of the third RFFE 236, corresponding to the plurality of antenna elements. In the case of transmission, each of the plurality of phase shifters 238 may convert the phase of a 5G Above6 RF signal to be transmitted to the outside (e.g., a base station in a 5G network) of the electronic device 101 through a corresponding antenna element. In the case of reception, each of the plurality of phase shifters 238 may convert the phase of a 5G Above6 RF signal received from the outside into the same or substantially the same phase through a corresponding antenna element. This enables transmission or reception between the electronic device 101 and the outside through beamforming.

The second cellular network 294 (e.g., a 5G network) may be operated independently (e.g., stand-alone (SA)) of the first cellular network 292 (e.g., a legacy network) or may be operated while being connected thereto (e.g., non-stand-alone (NSA)). For example, a 5G network may include only an access network (e.g., a 5G radio access network (RAN) or a next-generation RAN (NG RAN)) and may not include a core network (e.g., a next-generation core (NGC)). In this case, after accessing an access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., new radio (NR) protocol information) may be stored in the memory 230 and accessed by other components (e.g., the processor 120, the first communication processor 212, or the second communication processor 214).

Figure 3:
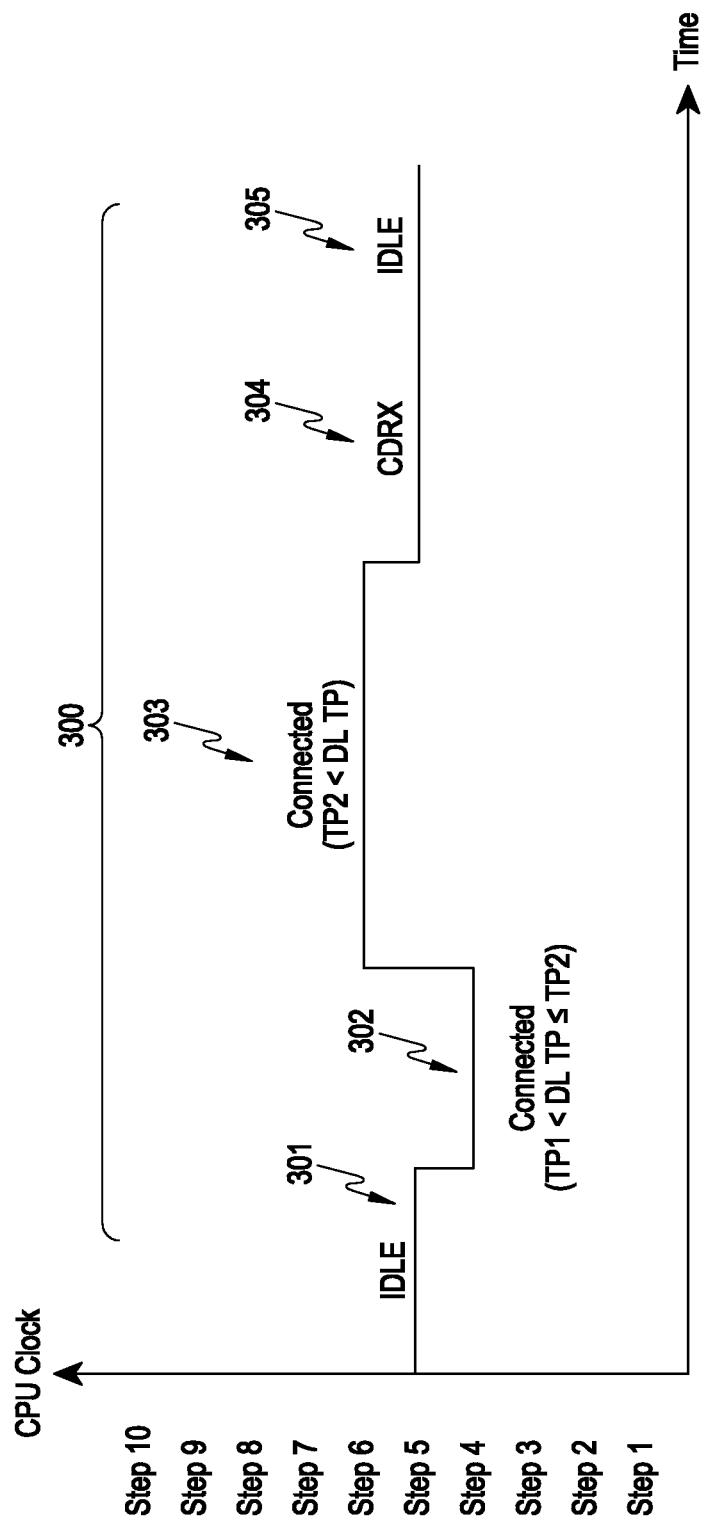
FIG. 3 is a diagram illustrating change of a CPU clock according to an embodiment.

FIG. 3 is a diagram illustrating change of a CPU clock according to an embodiment.

According to an embodiment, a communication processor (e.g., at least one of the processor 120 in FIG. 1, the first communication processor 212 in FIG. 2A, the second communication processor 214 in FIG. 2A, or the integrated communication processor 260 in FIG. 2B) may adjust a CPU clock 300, based on a state of the communication processor. The communication processor may refer to correlation information between states of the communication processor and CPU clocks stored, for example, in a built-in memory or an accessible memory (e.g., the memory 130 in FIG. 1). Table 1 is an example of correlation information between states of the communication processor and CPU clocks.

TABLE 1

| States of communication processor | CPU clocks |
| --- | --- |
| Idle discontinuous reception (I-DRX) state | Step 5 |
| Voice-over-LTE (VOLTE) or voice-over-NR (VoNR) execution state | Step 1 |
| Connected discontinuous reception (C-DRX) state | Step 5 |
| State in which downlink throughput exceeds value TP2 in RRC_Connected state | Step 6 |
| State in which downlink throughput exceeds value TP1 and is less than or equal to value TP2 in RRC_Connected state | Step 4 |
| State in which downlink throughput exceeds is less than or equal to value TP1 in RRC_Connected state | Step 3 |

Referring to Table 1, the electronic device 101 may control the CPU clock to be step 5, based on a Discontinuous Reception (DRX) state in the Radio Resource Control Idle (RRC_Idle) state. Herein, step 1 to step 5 are numerical values indicating the CPU clock, and may be actual frequency values and, for example, correspond to a higher frequency value as the step becomes higher. The electronic device 101 may control the CPU clock to be step 5, based on a Connected Discontinuous Reception (C-DRX) state in the Radio Resource Control Connected (RRC_Connected) state. An RRC_Connected state comprises the establishment of a point to point bi-directional connection between the RRC (Radio Resource Control) entities on the UE (User Equipment) and a UTRAN (UMTS Terrestrial Radio Access Network). The UE requires an RRC connection to access the services of the UMTS network.

For example, the electronic device 101 may enter the C-DRX state, based on expiration of a first timer (e.g., a DRX inactivity timer) in the RRC_Connected state. In the C-DRX state, the communication processor (e.g., at least one of the first communication processor 212, the second communication processor 214, or the integrated communication processor 260) of the electronic device 101 may wake up from a sleep state (e.g., a state in which less power is consumed than in a wake-up state, but not limited thereto) during a DRX sleep section and monitor a Physical Downlink Control Channel (PDCCH) for every DRX cycle (e.g., a short DRX cycle or a long DRX cycle). The electronic device 101 may enter an Idle Discontinuous Reception (I-DRX) state while entering the RRC_Idle state, based on expiration of a second timer (e.g., an Radio Resource Control (RRC) inactivity timer). In the I-DRX state, the electronic device 101 may wake up and monitor the PDCCH for every paging DRX cycle. In the C-DRX state and/or the I-DRX state, since decoding of the PDCCH and/or entry into the sleep state must be performed during relatively short wake-up duration (or may be referred to as on-duration), a higher CPU clock (e.g., step 5) may be allocated. In the case where VOLTE or VONR is performed, the throughput may be relatively low and/or the possibility of change in the throughput may be relatively low, so a lower CPU clock (e.g., step 1) may be allocated. Meanwhile, in the RRC_Connected state, different CPU clocks (e.g., step 3, step 4, and step 6) may be allocated to respective throughputs (e.g., the section in which the throughput is less than or equal to a value T1, the section in which the throughput exceeds the value T1 and less than or equal to a value T2, and the section in which the throughput exceeds the value T2). Relatively high throughput may denote that a relatively large number of processes must be processed and/or that a relatively large process must be processed, and accordingly, a higher CPU clock may be allocated thereto. Meanwhile, the values of the correlation information between states of the communication processor and CPU clocks and/or the size relationship thereof are only examples and are not limited, and it will be understood by those skilled in the art that at least some of the states of the communication processor may be omitted and/or that additional correlation information between additional states and CPU clocks corresponding to the additional states may be defined. Meanwhile, those skilled in the art will understand that, in an embodiment, it is possible to perform control, based on a single CPU clock, instead of different CPU clocks, for the respective throughput (TPs) in the RRC_Connected state.

According to an embodiment, the electronic device 101 may control the CPU clock 300 according to communication states, based on correlation information shown in Table 1. For example, in the idle state 301 (or the I-DRX state), the electronic device 101 may adjust the CPU clock to be step 5, based on Table 1. For example, in the RRC_Connected state 302, based on a throughput between a value TP1 and a value TP2, the electronic device 101 may adjust the CPU clock to be step 4, based on Table 1. For example, in the RRC_Connected state 303, based on a throughput exceeding the value TP2, the electronic device 101 may adjust the CPU clock to be step 6, based on Table 1. For example, based on expiration of a DRX inactivity timer, the electronic device 101 may enter a C-DRX state 304, and the electronic device 101 may adjust the CPU clock to be step 5, based on Table 1. For example, based on expiration of an RRC inactivity timer, the electronic device 101 may enter an idle state 305 (or the I-DRX state), and the electronic device 101 may adjust the CPU clock to be step 5, based on Table 1.

Figure 4:
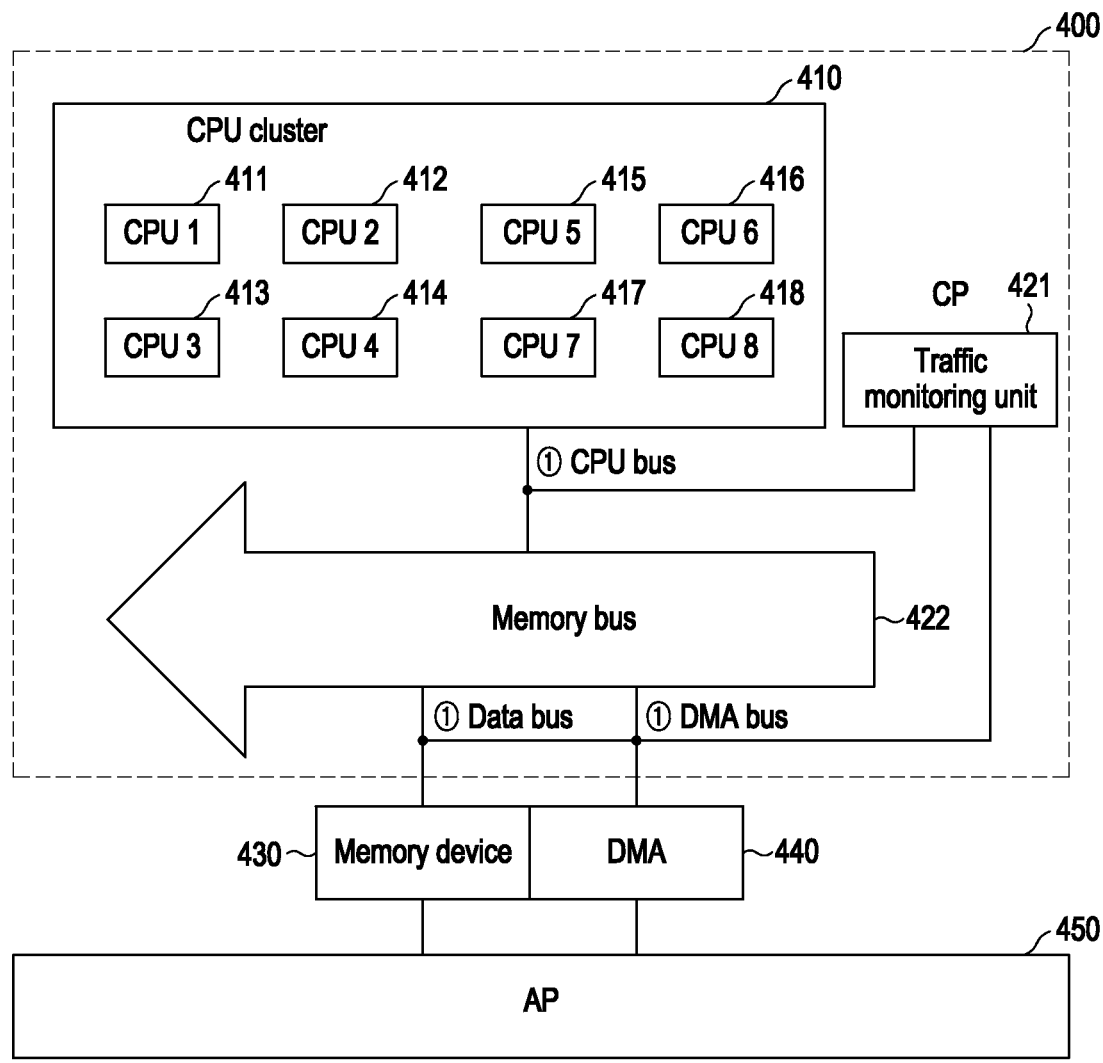
FIG. 4 is a diagram illustrating a communication processor, an application processor, a memory, and/or a direct memory access (DMA) according to an embodiment.

FIG. 4 is a diagram illustrating a communication processor, an application processor, a memory, and/or a direct memory access (DMA) according to an embodiment.

According to an embodiment, a communication processor 400 (e.g., at least one of the processor 120 in FIG. 1, the first communication processor 212 in FIG. 2A, the second communication processor 214 in FIG. 2A, or the integrated communication processors 260 in FIG. 2B) may include a CPU cluster 410. The CPU cluster 410 may include at least one CPU 411, 412, 413, 414, 415, 416, 417, or 418. The CPU cluster 410 may be implemented as a multi-CPU (multi-core), and at least one CPU 411, 412, 413, 414, 415, 416, 417, or 418 may be referred to as a core. Meanwhile, although eight CPUs (e.g., cores) are shown, this is exemplary and the number of cores is not limited thereto. At least some of the at least one CPU 411, 412, 413, 414, 415, 416, 417, or 418, for example, may perform processes for the operation of the communication processor 400. Although all the CPUs 411, 412, 413, 414, 415, 416, 417, and 418 may perform the processes, at least some of the at least one CPU 411, 412, 413, 414, 415, 416, 417, or 418 may not operate in the case of, for example, a small number of processes. At least one CPU 411, 412, 413, 414, 415, 416, 417, or 418 may operate based on a designated CPU clock. The communication processor 400 may control the CPU clock. For example, the communication processor 400 may include a CPU governor and/or a CPU driver so that the CPU clock may be controlled by the CPU governor and/or the CPU driver, but this is exemplary.

According to an embodiment, a traffic monitoring unit 421 included in the communication processor 400 may identify utilization (e.g., it is a percentage unit, but not limited thereto, and may be referred to as usage) for each of at least one CPU 411, 412, 413, 414, 415, 416, 417, or 418. For example, Table 2 shows an example of utilization for each of at least one CPU 411, 412, 413, 414, 415, 416, 417, or 418.

TABLE 2

| CPUs | Utilizations (%) |
|---|---|
| First CPU 411 | a1 |
| Second CPU 412 | a2 |
| Third CPU 413 | a3 |
| Fourth CPU 414 | a4 |
| Fifth CPU 415 | a5 |
| Sixth CPU 416 | a6 |
| Seventh CPU 417 | a7 |
| Eighth CPU 418 | a8 |

Meanwhile, monitoring utilizations for all CPUs 411 to 418 as shown in Table 2 is only an example, and utilizations of some CPUs may be monitored according to implementation. As will be described below, the CPU utilizations of some of the CPUs 411 to 418 may be used as at least some of input values of an artificial intelligence (AI) model, or the utilizations of all of the CPUs 411 to 418 may be used as at least some of input values of an AI model.

The traffic monitoring unit 421 according to an embodiment may monitor traffic of at least one bus related to a memory bus 422. According to an embodiment, the traffic monitoring unit 421 may monitor traffic of a CPU bus. The traffic of the CPU bus may be related to, for example, the amount of data for processing instructions in the CPU cluster 410. According to an embodiment, the traffic monitoring unit 421 may identify traffic of a data bus. The traffic of the data bus may be related to the amount of data for reading and/or writing in a memory device 430 (e.g., the memory 130 in FIG. 1). According to an embodiment, the traffic monitoring unit 421 may identify traffic of a direct memory access (DMA) bus. The traffic of the DMA bus may be related to, for example, the amount of data transmitted and received based on a DMA 440 between the communication processor 400 and an application processor 450. Meanwhile, a neural network processing device (e.g., the co-processor 123 in FIG. 1), which is included in the communication processor 400 and/or the application processor 450 or independent of the communication processor 400 and/or the application processor 450, may perform generating and training an AI model, selecting an AI model, and/or using an AI model (e.g., execution of an arithmetic operation corresponding to an AI model for an input value). The AI model may be stored in a memory of the electronic device 101 and/or in a memory of the neural network processing device. Meanwhile, the type of traffic to be monitored is exemplary and not limited thereto. As will be described below, all of the monitored traffic may be used as at least some of the input values of the AI model, or some of the monitored traffic may be used as at least some of the input values of the AI model. For example, according to implementation, the memory device 430 may be disposed inside the communication processor 400. According to implementation, the memory device 430 may be positioned outside the communication processor 400 and accessed by the communication processor 400. For example, according to implementation, the DMA 440 may be disposed inside the communication processor 400. According to implementation, the DMA 440 may be disposed outside the communication processor 400 and may transmit and receive data between the communication processor 400 and the application processor 450.

According to an embodiment, the communication processor 400 may primarily perform control such that the clocks for at least some of the CPUs 411 to 418 have values corresponding to the current state of the communication processor 400, based on the correlation information between states of the communication processor and CPU clocks shown in Table 1. For example, if the state of the communication processor corresponds to the state in which the downlink throughput exceeds a value TP2 in the RRC_Connected state, the communication processor 400 may control the CPU clock to be step 6, based on the correlation information shown in Table 1. After the primary control of the CPU clock, the communication processor 400 may secondarily control the CPU clock, based on an output value of the AI model. For example, the AI model may receive a workload of the communication processor 400 as an input value and provide a CPU clock value as an output value. The workload may include, for example, utilizations of at least some of the CPUs 411 to 418 of the communication processor 400. The workload, for example, may replace utilizations of at least some of the CPUs 411 to 418 and/or include at least one piece of traffic (e.g., the CPU bus traffic, the data bus traffic, and/or the DMA bus traffic) in addition to the utilizations of at least some of the CPUs 411 to 418. If a workload (e.g., utilizations of at least some of the CPUs 411 to 418 and/or at least one piece of traffic (e.g., the CPU bus traffic, the data bus traffic, and/or the DMA bus traffic)) is provided as an input value to the AI model, the AI model may provide a specific value of CPU clock as an output value. The communication processor 400 may secondarily control the CPU clock using the specific value as an output value from the AI model. Accordingly, the CPU clock may vary depending on the workload, instead of controlling the CPU clock to be fixed, in one state of the communication processor. The AI model, for example, may learn in order to minimize the output CPU clock as much as possible, and power consumption and/or heat generation of the communication processor 400 may be minimized according to the control of the CPU clock, based on the AI model.

Meanwhile, the primary control of the CPU clock based on the correlation information shown in Table 1 and the secondary control of the CPU clock based on the output value of the AI model are merely exemplary. In an embodiment, the communication processor 400 may control the CPU clock, based on the output value of the AI model, without preceding control of the CPU clock based on the correlation information shown in Table 1. In an embodiment, the communication processor 400 may select the control of the CPU clock based on the correlation information shown in Table 1 or select the control of the CPU clock based on the output value of the AI model, based on whether or not at least one condition is satisfied.

Figure 5A:
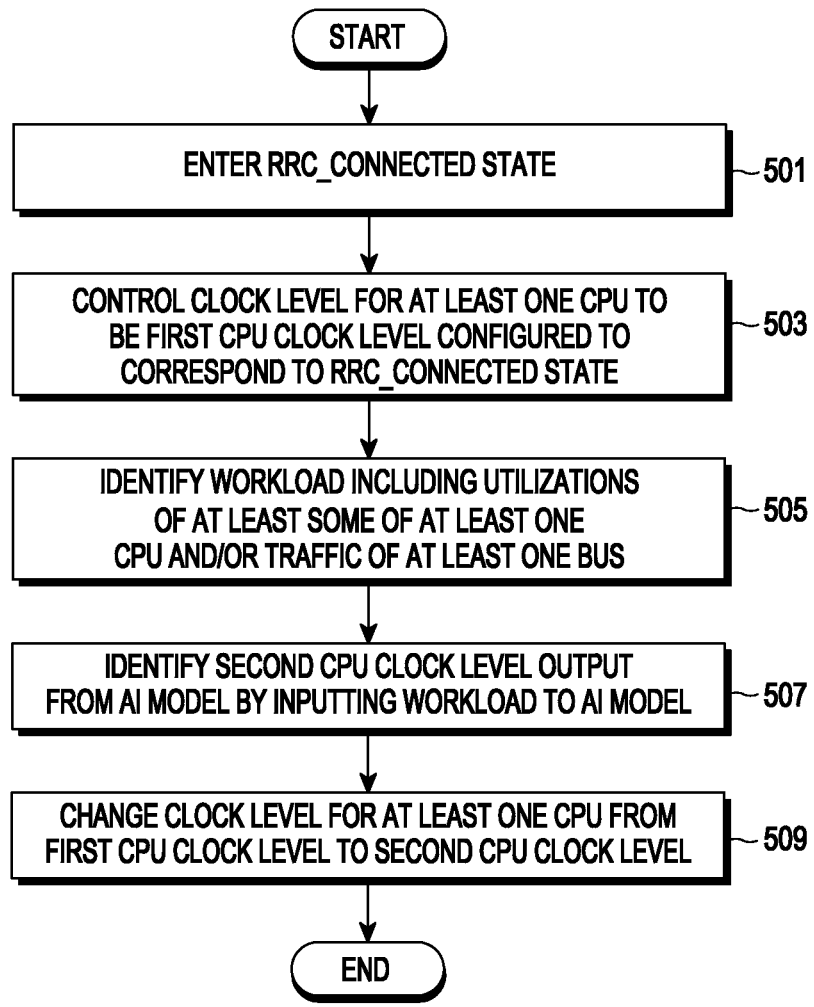
FIG. 5A is a flowchart illustrating an operation method of an electronic device according to an embodiment.
Figure 5B:
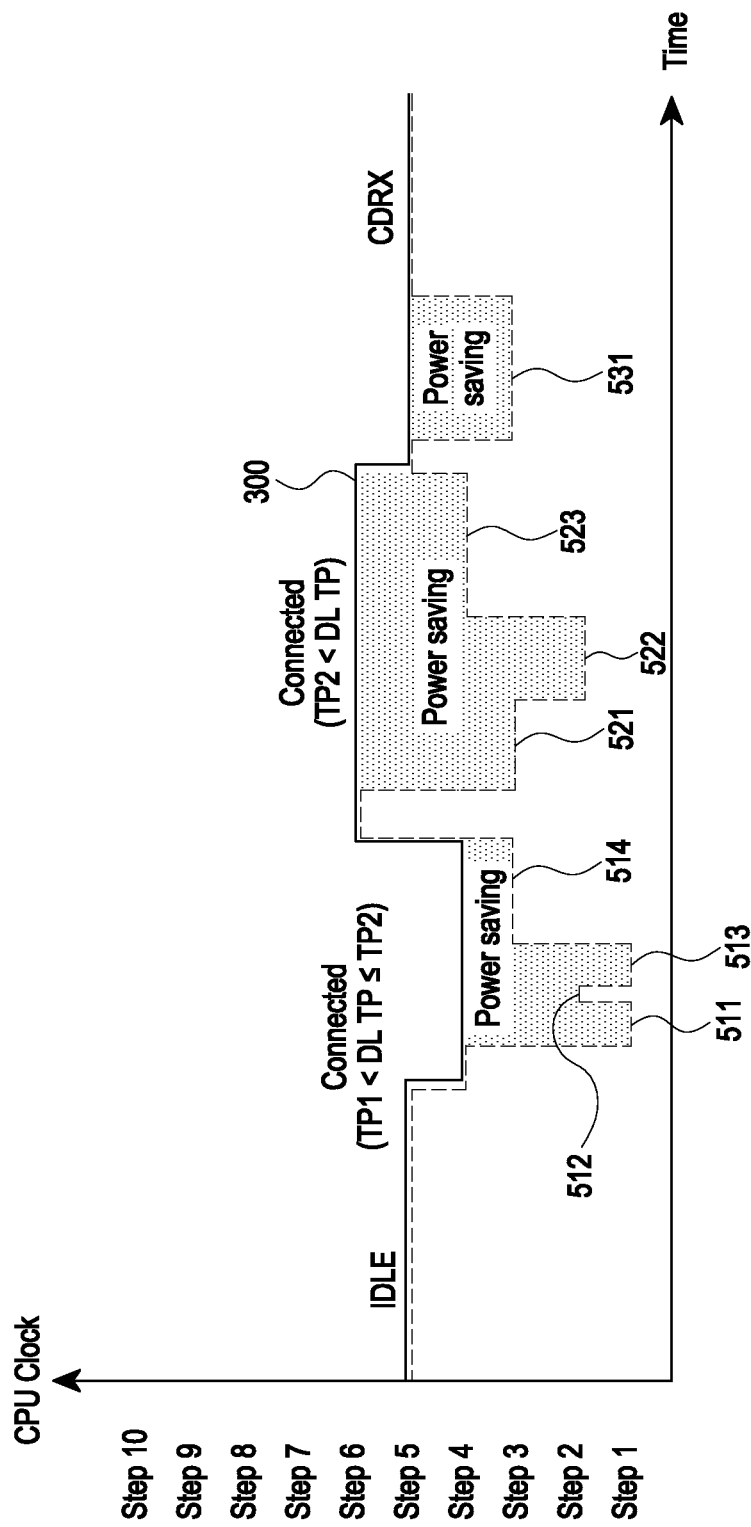
FIG. 5B is a diagram illustrating change of a CPU clock according to an embodiment.

FIG. 5A is a flowchart illustrating an operation method of an electronic device according to an embodiment. The embodiment shown in FIG. 5A will be described with reference to FIG. 5B. FIG. 5B is a diagram illustrating change of a CPU clock according to an embodiment.

According to an embodiment, an electronic device 101 (e.g., at least one of the processor 120 in FIG. 1, the first communication processor 212 in FIG. 2A, the second communication processor 214 in FIG. 2A, the integrated communication processor 260 in FIG. 2B, or the communication processor 400) may enter an RRC_Connected state in operation 501. For example, the electronic device 101 may enter the RRC_Connected state from an RRC_Idle state. Triggers (or conditions) for entering the RRC_Connected state from the RRC_Idle state are not limited. For example, the electronic device 101 may exit a C-DRX state (or cease the C-DRX), based on a result of monitoring a PDCCH, in the C-DRX state. Although the C-DRX state corresponds to the RRC_Connected state, exiting the C-DRX state (or ceasing the C-DRX) may also be expressed (or defined) as entering the RRC_Connected state in the disclosure. For example, the electronic device 101, in the RRC_Connected state, may be configured to perform operation 503 and operations subsequent thereto even if the downlink throughput changes (or if a range including the downlink throughput changes).

For example, referring to FIG. 5B, the electronic device 101, in the RRC_Idle state, may determine the CPU clock level corresponding to the RRC_Idle state (or the I-DRX state) to be step 5, based on, for example, the correlation information shown in Table 1. The electronic device 101 may control the CPU clock level to be a CPU clock level (e.g., step 5) corresponding to the RRC_Idle state (or the I-DRX state). Meanwhile, the electronic device 101 may enter the RRC_Connected state from the RRC_Idle state. As described above, Triggers (or conditions) for entering the RRC_Connected state from the RRC_Idle state are not limited.

Referring back to FIG. 5A, according to an embodiment, the electronic device 101 may control the clock level for at least one CPU to be a first CPU clock level configured to correspond to the RRC_Connected state in operation 503. For example, the first CPU clock level configured to correspond to the RRC_Connected state may be pre-configured. For example, as shown in Table 1, a plurality of CPU clock levels may be configured based on the current downlink throughput even in the RRC_Connected state. In this case, the electronic device 101 may determine the first CPU clock level, based on the current downlink throughput. For example, in the case where the correlation information shown in Table 1 is stored, the electronic device 101 may select a CPU clock level of step 6 if the current downlink throughput exceeds a value TP 2, select a CPU clock level of step 4 if the current downlink throughput exceeds a value TP 1 and is less than or equal to the TP 2, or select a CPU clock level of step 3 if the current downlink throughput is less than or equal to the TP 1. Meanwhile, those skilled in the art will understand that there is no limit on the types of the parameters that may affect the CPU clock levels, in addition to the downlink throughput. For example, the electronic device 101, in the RRC_Connected state, may determine the CPU clock level, based on at least one other parameter replacing the downlink throughput. For example, the electronic device 101 may determine the CPU clock level based on at least one other parameter, in addition to the downlink throughput, in the RRC_Connected state.

For example, referring to FIG. 5B, the electronic device 101, based on the current downlink throughput that exceeds the TP 1 and is less than or equal to the value TP 2, may identify step 4 corresponding thereto as the first CPU clock level. Based on the entry to the RRC_Connected state, the electronic device 101 may control the CPU clock level to be step 4 corresponding to the current downlink throughput.

Referring back to FIG. 5A, according to an embodiment, the electronic device 101 may identify a workload including utilizations of at least some of at least one CPU and/or traffic of at least one bus in operation 505. The electronic device 101 may identify a second CPU clock level output from the AI model by inputting the workload to the AI model in operation 507. The electronic device 101 may change the clock level for at least one CPU from the first CPU clock level to the second clock level in operation 509. The AI model may receive the workload as an input value and provide the CPU clock level as an output value. The AI model may be, for example, a neural network model but is not limited thereto. In the case where the AI model is a neural network model, the type of the neural network model, the number of layers of the neural network model, the input values (or the number of input nodes) of the neural network model, the number of nodes in each intermediate layer (or hidden layer) of the neural network model, and/or the type of activation function of the neural network model are not limited. The input value of the AI model may be a workload as described above, and the workload may include utilizations of at least some of at least one CPU and/or traffic of at least one bus. For example, the workload may include utilizations of some of at least one CPU. Some of at least one CPU may be, for example, CPUs that consistently remain in an on state (also referred to as an activated state and/or an enabled state) even if there is no data transmission and reception by the communication processor. For example, the CPU that consistently remains in the on state may be related to the operation of an OS, but the type of process to be performed by the corresponding CPU are not limited. Meanwhile, this is merely exemplary, and some of at least one CPU may also include the CPUs that consistently remain in the on state and/or other CPUs. For example, the workload may include utilizations of all of at least one CPU. For example, the workload may include the entire traffic of at least one bus (e.g., the CPU bus traffic, the data bus traffic, and/or the DMA bus traffic). For example, the workload may include some of the traffic of at least one bus (e.g., the CPU bus traffic, the data bus traffic, and/or the DMA bus traffic). The AI model may learn based on a training data set including, for example, input values including utilizations of at least some of at least one CPU and/or traffic of at least one bus, and output values of the CPU clock level corresponding thereto. An embodiment of training of the AI model will be described later. The AI model may receive the workload as an input value and output a second CPU clock level. The electronic device 101 may control the CPU clock level to be the second CPU clock level output from the AI model. The electronic device 101, for example, may identify information about NN of the AI model, weights corresponding to nodes of the AI model, and/or biases corresponding thereto and/or receive the same from another device providing the AI model (e.g., a device performing learning and/or a device managing the AI model that has completed learning). The AI model may be updated. For example, the AI model may be replaced by a different AI model that is newly received, or the weights and/or biases corresponding to the nodes configuring NN may be updated while maintaining the NN structure of the AI model.

For example, referring to FIG. 5B, the electronic device 101 may control the CPU clock level to be values 511, 512, 513, and 514 output from the AI model. For example, if the downlink throughput exceeds a TP 1 and is less than or equal to a TP 2, the electronic device 101, based on the fact that an output value of the AI model that received a first workload as an input value at a first time is step 1 (511), may control the CPU clock level to be step 1 (511). For example, if the downlink throughput exceeds the TP 1 and is less than or equal to the TP 2, the electronic device 101, based on the fact that an output value of the AI model that received a second workload as an input value at a second time is step 2 (512), may control the CPU clock level to be step 2 (512). For example, the second workload may be at least partially different from the first workload, and accordingly, the output value of the AI model may change from step 1 (511) to step 2 (512). For example, if the downlink throughput exceeds the TP 1 and is less than or equal to the TP 2, the electronic device 101, based on the fact that an output value of the AI model that received a third workload as an input value at a third time is step 1 (513), may control the CPU clock level to be step 1 (513). For example, if the downlink throughput exceeds the TP 1 and is less than or equal to the TP 2, the electronic device 101, based on the fact that an output value of the AI model that received a fourth workload as an input value at a fourth time is step 4 (514), may control the CPU clock level to be step 4 (514). As described above, the control of the CPU clock level according to the output values 511, 512, 513, and 514 of the AI model may bring about power saving, compared to the case 300 in which the CPU clock level is fixed to step 4.

For example, if the downlink throughput exceeds the TP 2, the electronic device 101 may primarily control the CPU clock level to be step 6 corresponding to the case in which the downlink throughput exceeds the TP 2, based on the correlation information shown in Table 1. As described above, the electronic device 101, in the RRC_Connected state, may primarily control the CPU clock level, based on the correlation information shown in Table 1, even if the downlink throughput changes (or if a range including the downlink throughput changes, where the range corresponds to the CPU clock level). After primarily controlling the CPU clock level, based on the correlation information shown in Table 1, the electronic device 101 may further control the CPU clock level, based on an output value of the AI model. For example, if the downlink throughput exceeds a TP 2, the electronic device 101, based on the fact that an output value of the AI model that received a fifth workload as an input value at a fifth time is step 3 (521), may control the CPU clock level to be step 3 (521). For example, if the downlink throughput exceeds the TP 2, the electronic device 101, based on the fact that an output value of the AI model that received a sixth workload as an input value at a sixth time is step 2 (522), may control the CPU clock level to be step 2 (522). If the downlink throughput exceeds the TP 2, the electronic device 101, based on the fact that an output value of the AI model that received a seventh workload as an input value at a seventh time is step 4 (523), may control the CPU clock level to be step 4 (523). As described above, the control of the CPU clock level according to the output values 521, 522, and 523 of the AI model may bring about power saving, compared to the case 300 in which the CPU clock level is fixed to step 6.

For example, the electronic device 101 may enter a C-DRX state. The electronic device 101 may primarily control the CPU clock level to be step 5 in the C-DRX state, based on the correlation information shown in Table 1. As described above, in the RRC_Connected state, the electronic device 101 may primarily control the CPU clock level, based on the correlation information in Table 1 even in the case of entering the C-DRX state. After primarily controlling the CPU clock level, based on the correlation information shown in Table 1, the electronic device 101 may further control the CPU clock level, based on an output value of the AI model. For example, based on the fact that an output value of the AI model that received an eighth workload as an input value at an eighth time is step 3 (531), the electronic device 101 may control the CPU clock level to be step 3 (531). In an embodiment, the AI model used in the C-DRX state may be the same as the AI model in the RRC_Connected state. In an embodiment, the AI model used in the C-DRX state may be different from the AI model in the RRC_Connected state. For example, since the AI model used in the C-DRX state must identify a PDCCH and/or a corresponding PDSCH within a relatively short time, it may learn to have an output value of a relatively high CPU clock level, but this is merely exemplary and not limited thereto. As described above, the control of the CPU clock level according to the output values 531 of the AI model may bring about power saving, compared to the case 300 in which the CPU clock level is fixed to step 5.

According to an embodiment, the electronic device 101 may adjust the CPU level, based on the output value of the AI model, or adjust the CPU clock level by a specified unit in operation 509. For example, if a second CPU clock level identified based on an output value of the AI model is lower than a first CPU clock level identified based on correlation information, the electronic device 101 may reduce the CPU clock level by a specified unit. For example, if the second CPU clock level identified based on an output value of the AI model is higher than the first CPU clock level identified based on correlation information, the electronic device 101 may increase the CPU clock level by a specified unit.

Figure 6A:
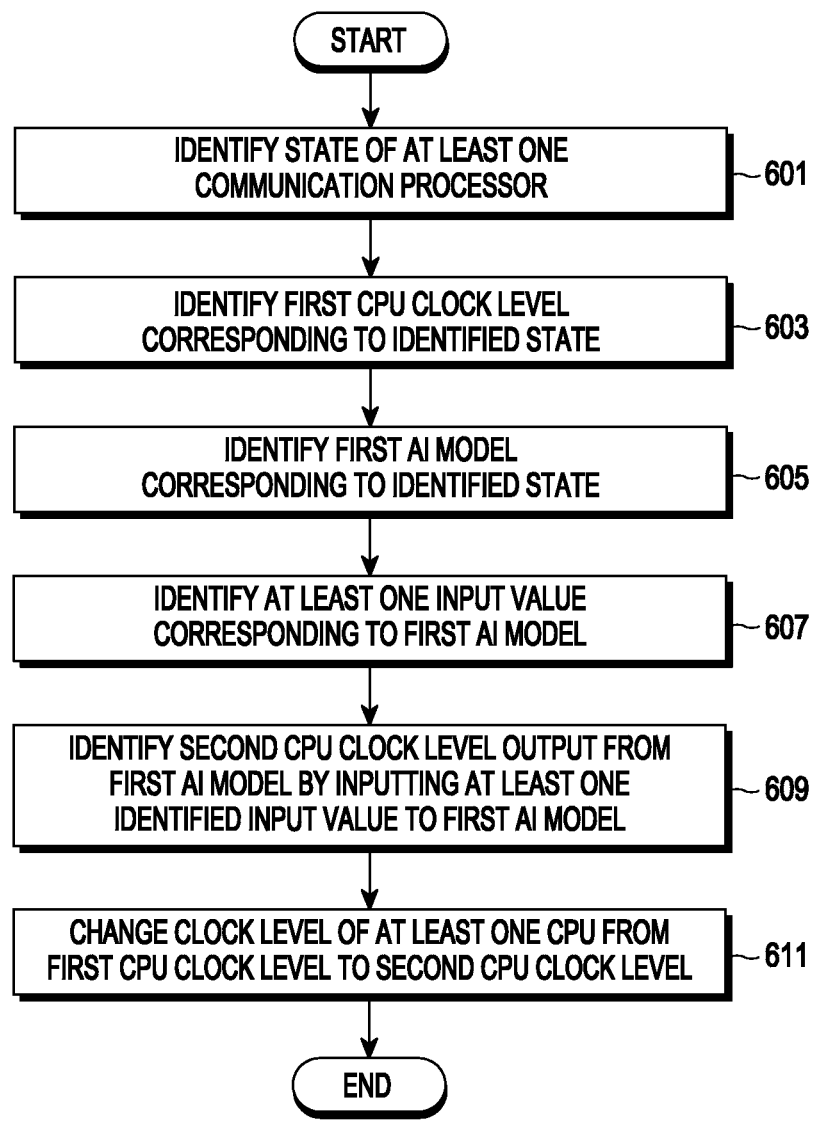
FIG. 6A is a flowchart illustrating an operation method of an electronic device according to an embodiment.
Figure 6B:
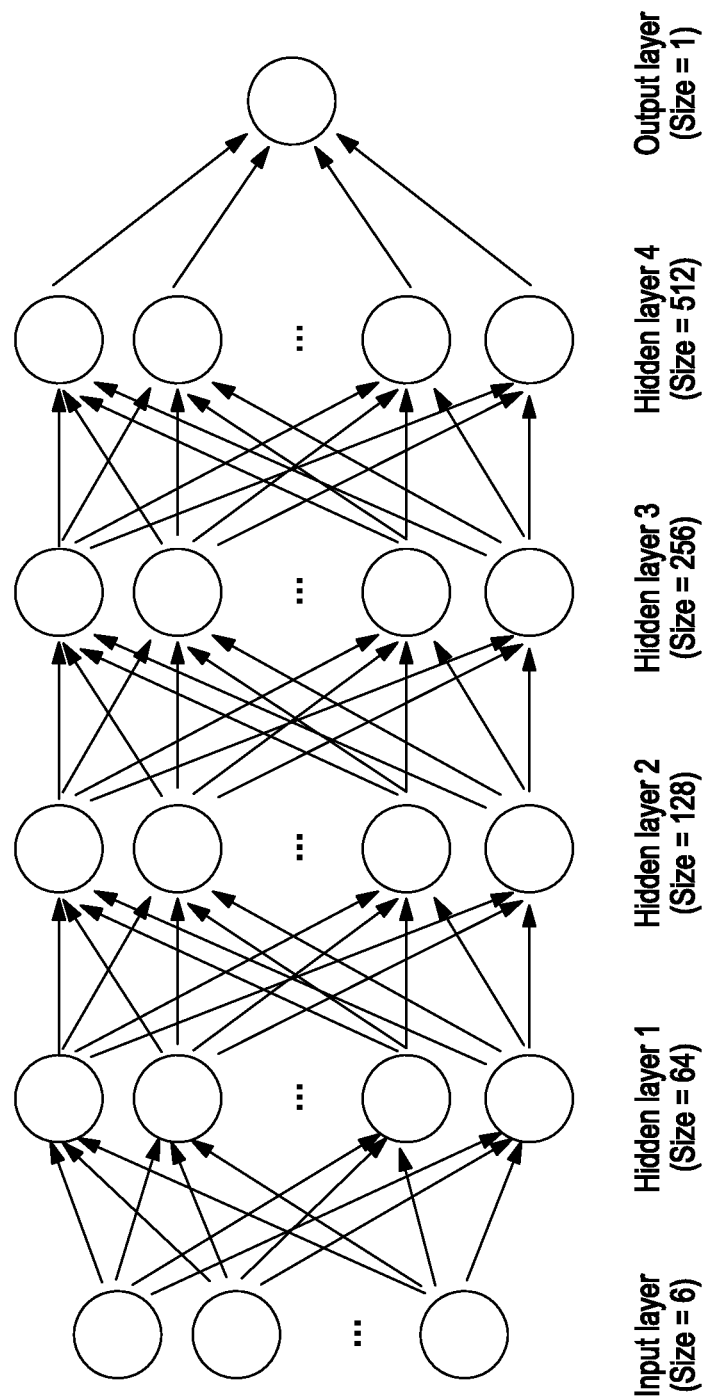
FIGS. 6B to 6D are diagrams illustrating NN structures of AI models according to various embodiments.
Figure 6C:
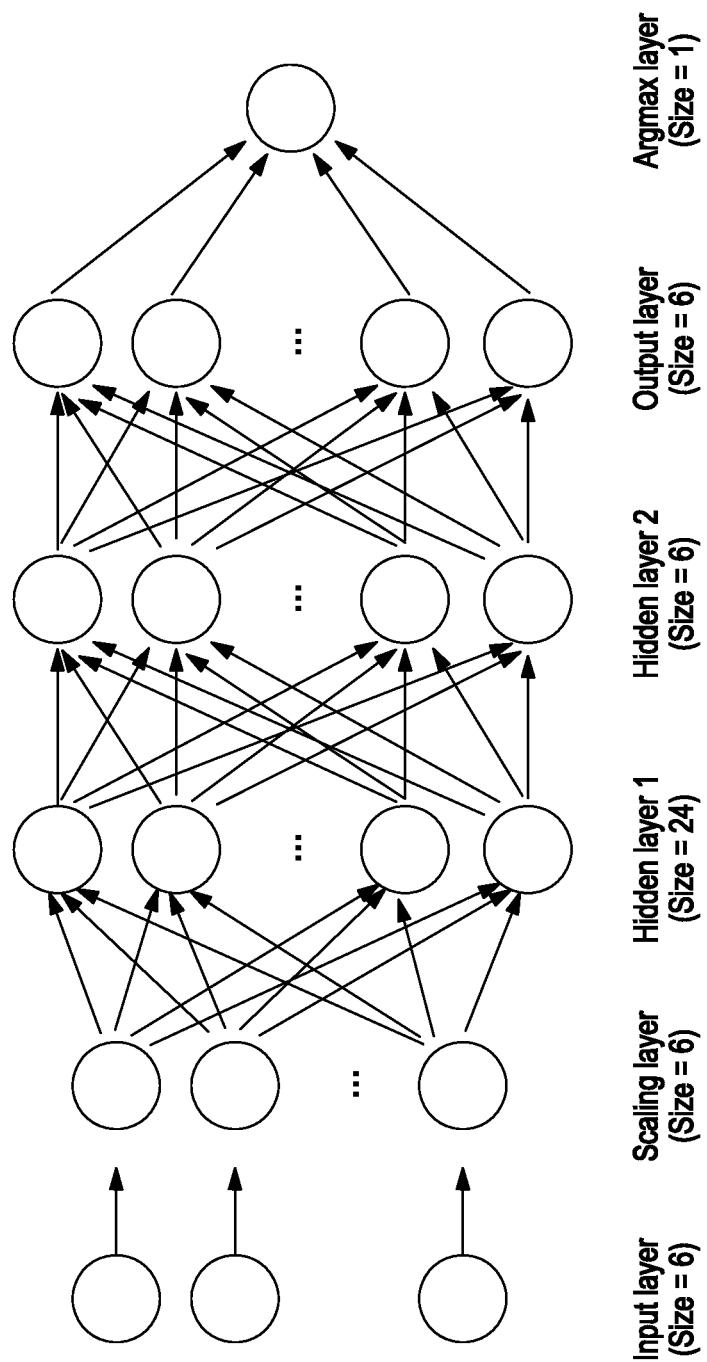
Figure 6D:
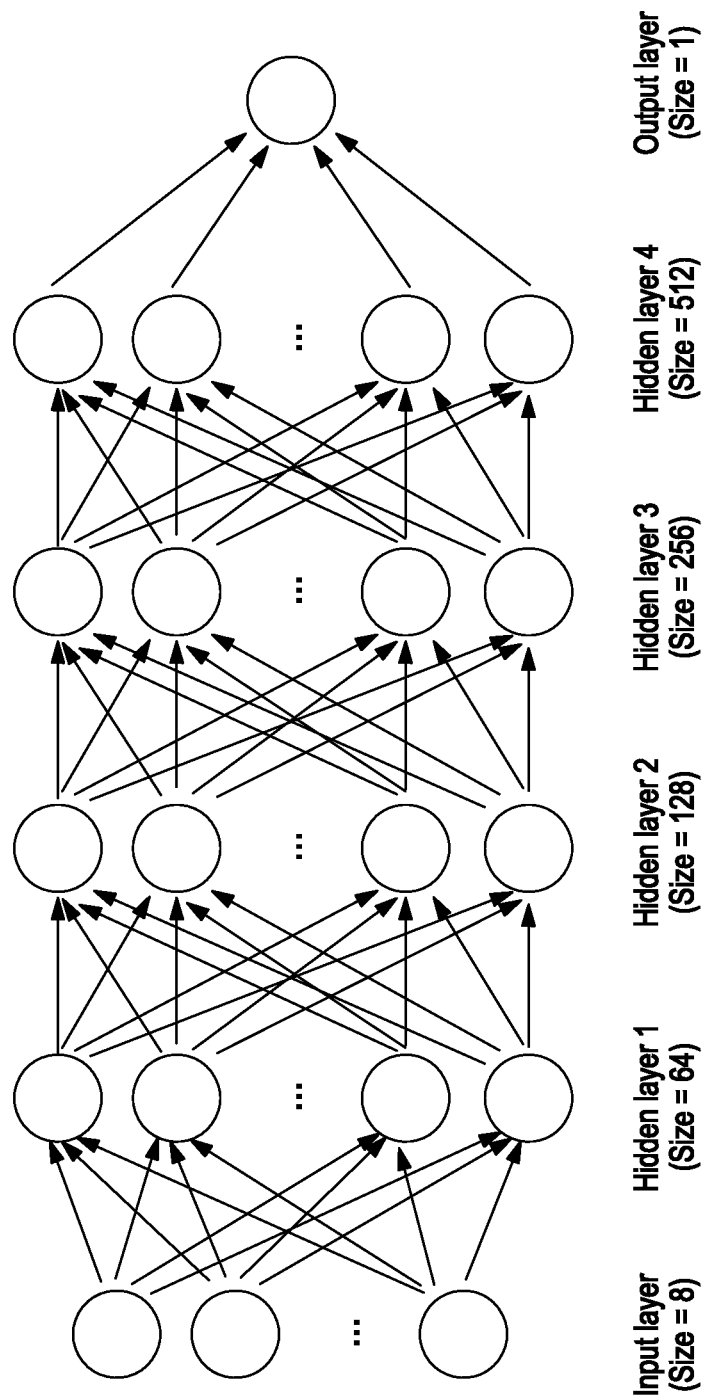

FIG. 6A is a flowchart illustrating an operation method of an electronic device according to an embodiment. The embodiment shown in FIG. 6A will be described with reference to FIGS. 6B to 6D. FIGS. 6B to 6D are diagrams illustrating NN structures of AI models according to various embodiments.

According to an embodiment, an electronic device 101 (e.g., at least one of the processor 120 in FIG. 1, the first communication processor 212 in FIG. 2A, the second communication processor 214 in FIG. 2A, the integrated communication processor 260 in FIG. 2B, or the communication processor 400) may identify the state of at least one communication processor in operation 601. The electronic device 101 may identify a first CPU clock level corresponding to the identified state in operation 603. The electronic device 101 may identify a first AI model corresponding to the identified state in operation 605. For example, the electronic device 101 may select the first AI model corresponding to the identified state from among a plurality of AI models. For example, AI models corresponding to respective states of at least one communication processor may be selected by the electronic device 101. Table 3 shows an example of AI models corresponding to respective states of at least one communication processor.

TABLE 3

| States of communication processor | AI models |
| --- | --- |
| Idle DRX state or C-DRX state | AI model #1 |
| VOLTE or VoNR execution state | AI model #2 |
| RRC_Connected state | AI model #3 |

For example, at least two AI models among the selectable AI models may have the same neural network (NN) structure, but at least one weight and/or bias of the nodes constituting the NN may differ. For example, AI model #1 and AI model #2 may have the NN structure shown in FIG. 6B. For example, in the NN structure in FIG. 6B, an input layer may have 6 input nodes, 4 hidden layers may have 64, 128, 256, and 512 nodes, respectively, and an output layer may have output nodes. Meanwhile, the weight and/or bias of a first node of a hidden layer 1 of AI model #1 may be different from the weight and/or bias of a first node of a hidden layer 1 of AI model #2. This is due to the fact that, for example, training data of AI model #1 for the DRX state is different from training data of AI model #2 for the VOLTE or VONR execution state.

For example, at least two AI models among the selectable AI models may have the same NN structure, but parameters of input values of input layers constituting the NN may at least partially differ. For example, AI model #1 may have the NN structure shown in FIG. 6B. In the NN structure in FIG. 6B, an input layer may be identified to have 6 nodes. For example, six input parameters corresponding to six nodes of an input layer of AI model #1 may be three utilizations including utilization of the first CPU 411, utilization of the second CPU 412, and utilization of the third CPU 413 in FIG. 4 and three pieces of bus traffic including the CPU bus traffic, the data bus traffic, and/or the DMA bus traffic. For example, the first CPU 411, the second CPU 412, and the third CPU 413 may be, for example, CPUs configured to consistently remain in the on state by the communication processor even while not transmitting and receiving data, but are not limited thereto. For example, AI model #2 may have the NN structure shown in FIG. 6B. For example, six input parameters corresponding to six nodes of an input layer of AI model #2 may be three utilizations including utilization of the first CPU 411, utilization of the second CPU 412, and utilization of the fourth CPU 414 in FIG. 4 and three pieces of bus traffic including the CPU bus traffic, the data bus traffic, and/or the DMA bus traffic. For example, at least two AI models among the selectable AI models may have the same NN structure, but may at least partially differ in the activation function. The NN structures and/or activation functions of the AI models, for example, may be selected to be suitable for the state of the communication processor.

For example, at least two AI models among the selectable AI models may have different NN structures. For example, AI model #1 may have the NN structure shown in FIG. 6B. In the NN structure in FIG. 6B, a hidden layer 1 may be identified to have 24 nodes. For example, AI model #2 may have the NN structure shown in FIG. 6C. In the NN structure in FIG. 6C, a hidden layer 1 may be identified to have 64 nodes. Referring to FIG. 6C, an input layer having a total of 6 nodes may be configured, a scaling layer that standardizes a transmitted input value utilizing an average and standard deviation may be configured, and two hidden layers having 24 nodes and 6 nodes, respectively, may be configured. The output layer may transmit a predicted probability value of 6 clock levels to an argmax layer using a softmax activation function. The argmax layer may select the greatest value among them and output an index of the CPU clock level. In an example, six input parameters corresponding to six nodes of an input layer of AI model #1 may be the same as or at least partially different from six input parameters corresponding to six nodes of an input layer of AI model #2. For example, AI model #3 may have the NN structure shown in FIG. 6D. For example, in the NN structure in FIG. 6D, an input layer may be identified to have 8 nodes. For example, eight input parameters corresponding to eight nodes of an input layer of AI model #3 may be five utilizations including utilization of the first CPU 411, utilization of the second CPU 412, utilization of the third CPU 413, utilization of the fourth CPU 414, and utilization of the fifth CPU 415 in FIG. 4 and three pieces of bus traffic including the CPU bus traffic, the data bus traffic, and/or the DMA bus traffic. Meanwhile, the above-described examples are merely exemplary, and those skilled in the art will understand that the type of AI model, the NN structures of the AI model, the activation functions of the AI model, and/or the input parameters of the AI model are not limited.

Referring back to FIG. 6A, the electronic device 101 may identify at least one input value corresponding to the first AI model in operation 607. For example, the electronic device 101 may identify a current value corresponding to at least one input parameter corresponding to the first AI model, as at least one input value. For example, in the case where six input parameters corresponding to six nodes of an input layer of AI model #1 are three utilizations including utilization of the first CPU 411, utilization of the second CPU 412, and utilization of the third CPU 413 in FIG. 4 and three pieces of bus traffic including the CPU bus traffic, the data bus traffic, and/or the DMA bus traffic, current values of the corresponding parameters may be identified. For example, in the case where eight input parameters corresponding to eight nodes of an input layer of AI model #3 are five utilizations including utilization of the first CPU 411, utilization of the second CPU 412, utilization of the third CPU 413, utilization of the fourth CPU 414, and utilization of the fifth CPU 415 in FIG. 4 and three pieces of bus traffic including the CPU bus traffic, the data bus traffic, and/or the DMA bus traffic, current values of the corresponding parameters may be identified. In operation 609, the electronic device 101 may identify a second CPU clock level output from the first AI model by inputting at least one identified input value to the first AI model. In operation 611, the electronic device 101 may change the clock level of at least one CPU from the first CPU clock level to the second clock level. As described above, the electronic device 101 may control the clock level of the CPU using the AI model corresponding to the current state of the communication processor. Using different AI models depending on each current state of the communication processor may bring about power saving, compared to the case in which the CPU clock level is fixed.

Figure 6E:
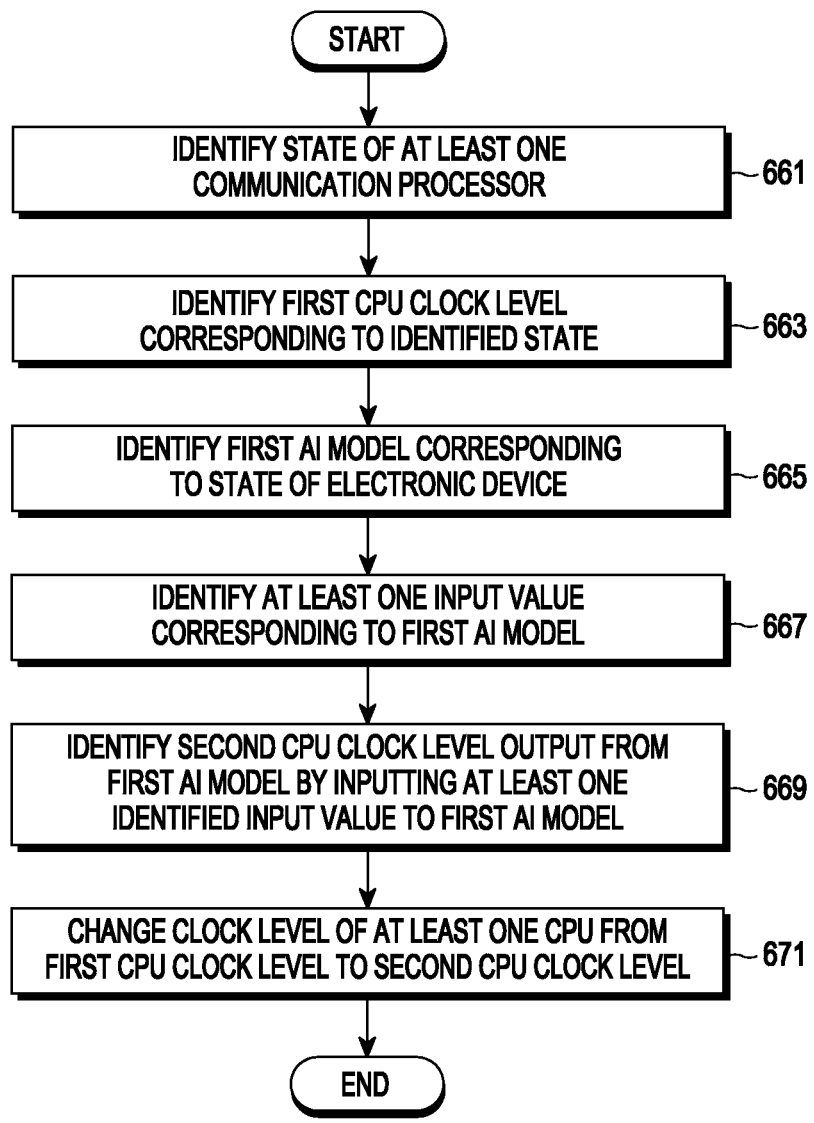
FIG. 6E is a flowchart illustrating an operation method of an electronic device according to an embodiment.

FIG. 6E is a flowchart illustrating an operation method of an electronic device according to an embodiment.

According to an embodiment, an electronic device 101 (e.g., at least one of the processor 120 in FIG. 1, the first communication processor 212 in FIG. 2A, the second communication processor 214 in FIG. 2A, the integrated communication processor 260 in FIG. 2B, or the communication processor 400) may identify the state of at least one communication processor in operation 661. The electronic device 101, in operation 663, may identify a first CPU clock level corresponding to the identified state. The electronic device 101, in operation 665, may identify a first AI model corresponding to the state of the electronic device 101. For example, the electronic device 101 may select a first AI model corresponding to the state of the electronic device 101 from among a plurality of AI models. For example, the AI models corresponding to respective states of the electronic device may be selected by the electronic device 101. Table 4 shows an example of AI models corresponding to respective states of the electronic device.

TABLE 4

| States of electronic device | AI models |
| --- | --- |
| Over-temperature state | AI model #1 |
| Low-power state | AI model #2 |
| Inactivation state | AI model #3 |

For example, as described with reference to Table 3, at least some of the AI models based on the example in Table 4 may be the same or different. In operation 667, the electronic device 101 may identify at least one input value corresponding to the first AI model. For example, the electronic device 101 may identify a current value corresponding to at least one input parameter corresponding to the first AI model, as at least one input value. In operation 669, the electronic device 101 may input at least one identified input value to the first AI model to identify a second CPU clock level output from the first AI model. In operation 671, the electronic device 101 may change the clock level of at least one CPU from the first CPU clock level to the second clock level. As described above, the electronic device 101 may control the clock level of the CPU using the AI model corresponding to the current state of the electronic device. Using different AI models depending on each current state of the communication processor may bring about power saving, compared to the case in which the CPU clock level is fixed.

According to an embodiment, the electronic device 101 may select the AI model using both the state of the electronic device state and the state of the communication processor.

Figure 7A:
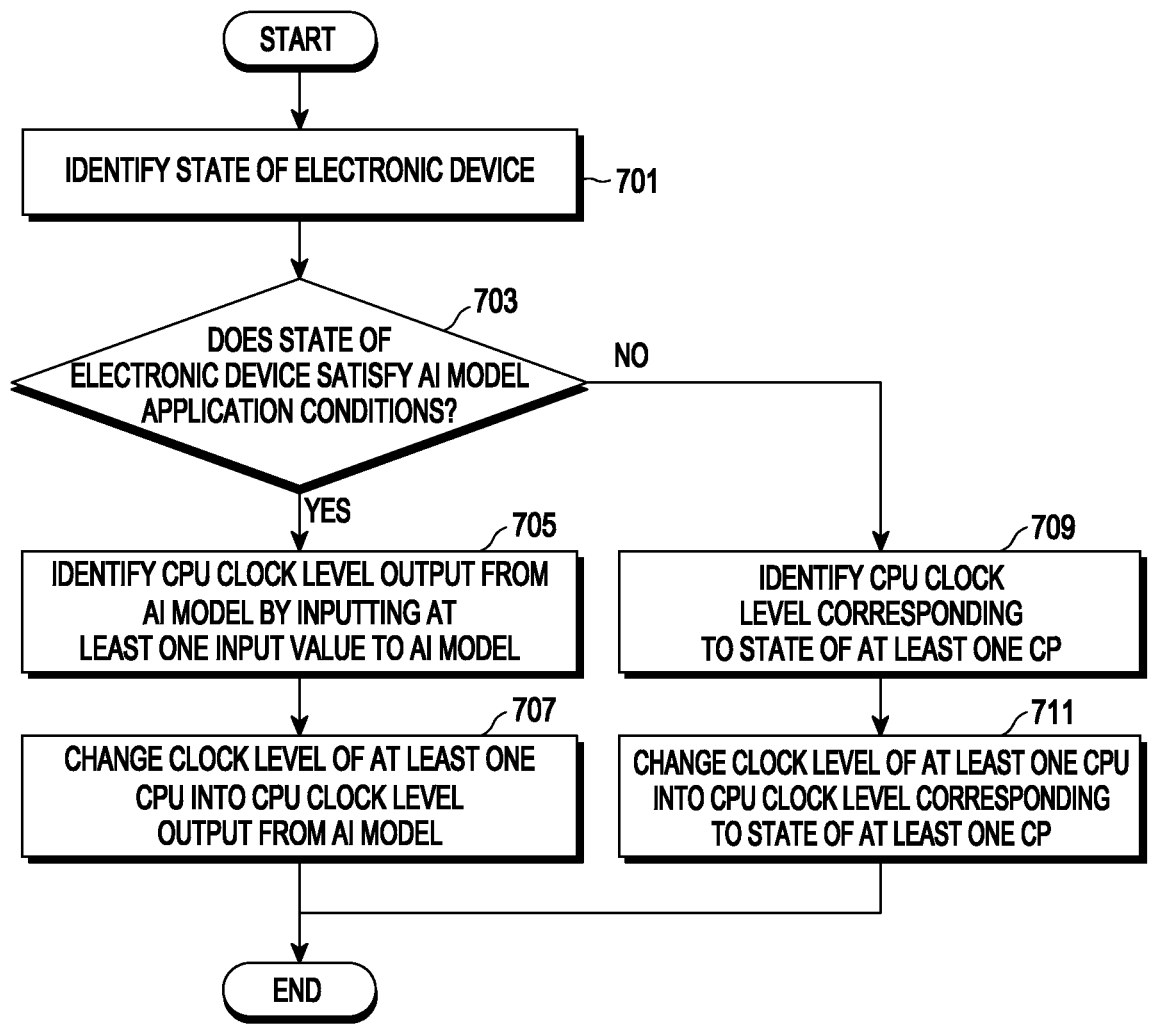
FIG. 7A is a flowchart illustrating an operation method of an electronic device according to an embodiment.

FIG. 7A is a flowchart illustrating an operation method of an electronic device according to an embodiment.

According to an embodiment, an electronic device 101 (e.g., at least one of the processor 120 in FIG. 1, the first communication processor 212 in FIG. 2A, the second communication processor 214 in FIG. 2A, the integrated communication processor 260 in FIG. 2B, or the communication processor 400) may identify the state of the electronic device in operation 701. In operation 703, the electronic device 101 may identify whether or not the state of the electronic device satisfies AI model application conditions. In an example, the electronic device 101 may identify whether or not the remaining battery power, as at least part of the state of the electronic device, satisfies AI model application conditions (e.g., a condition in which the remaining battery power is less than or equal to a threshold remaining battery power). Those skilled in the art will understand that the AI model application conditions may include software conditions such as, for example, whether an application (e.g., an application requiring relatively high TP such as a video streaming service application) in a specific type (or included in a specific category) is not executed, as well as the conditions related to hardware, simply measured in the electronic device 101, and the AI model application conditions are not limited. If the AI model application conditions are satisfied (YES in 703), the electronic device 101 may input at least one input value to the AI model to identify a CPU clock level output from the AI model in operation 705. For example, the electronic device 101 may input at least one input value to a single AI model used when the AI model application conditions are satisfied. For example, as described with reference to FIG. 6A, the electronic device 101 may select the AI model, based on the state of at least one communication processor, and input at least one input value to the selected AI model. For example, as described with reference to FIG. 6E, the electronic device 101 may select the AI model, based on the state of the electronic device, and input at least one input value to the selected AI model. In operation 707, the electronic device 101 may change the clock level of at least one CPU into the CPU clock level output from the AI model. If the AI model application conditions are not satisfied (NO in 703), the electronic device 101 may identify a CPU clock level corresponding to the state of at least one communication processor in operation 709. For example, the electronic device 101 may identify a CPU clock level corresponding to the state of at least one communication processor, based on the correlation information shown in Table 1. In operation 711, the electronic device 101 may change the clock level of at least one CPU into the CPU clock level corresponding to the state of at least one communication processor.

For example, as shown in the embodiment in FIG. 5A, in the case where the electronic device 101 primarily controls the CPU clock level, based on the correlation information shown in Table 1, and secondarily controls the CPU clock level, based on the AI model, the electronic device 101 may further control the CPU clock level secondarily, based on the AI model, if the state of the electronic device satisfies the AI model application conditions. For example, if the state of the electronic device does not satisfy the AI model application conditions, the electronic device 101 may perform control of the CPU clock level, based on the correlation information shown in Table 1, and may avoid further secondary adjustment of the CPU clock level based on the AI model. Meanwhile, this is merely exemplary, and those skilled in the art will understand that the electronic device 101 may perform the primary CPU clock level control based on the correlation information shown in Table 1 and the secondary CPU clock level control based on the AI model as described in FIG. 5A, instead of determining whether or not the AI model application conditions are satisfied.

For example, the electronic device 101 may selectively perform any one of the CPU clock level control based on the correlation information shown in Table 1 and the CPU clock level control based on the AI model according to the state of the electronic device as described in FIG. 7A, instead of performing the primary CPU clock level control based on the correlation information shown in Table 1 and the secondary CPU clock level control based on the AI model. Those skilled in the art will understand that, depending on the state of the electronic device, the CPU clock level control based on the AI model may be performed first, and then the CPU clock level control based on the correlation information shown in Table 1 may be performed, and vice versa.

Figure 7B:
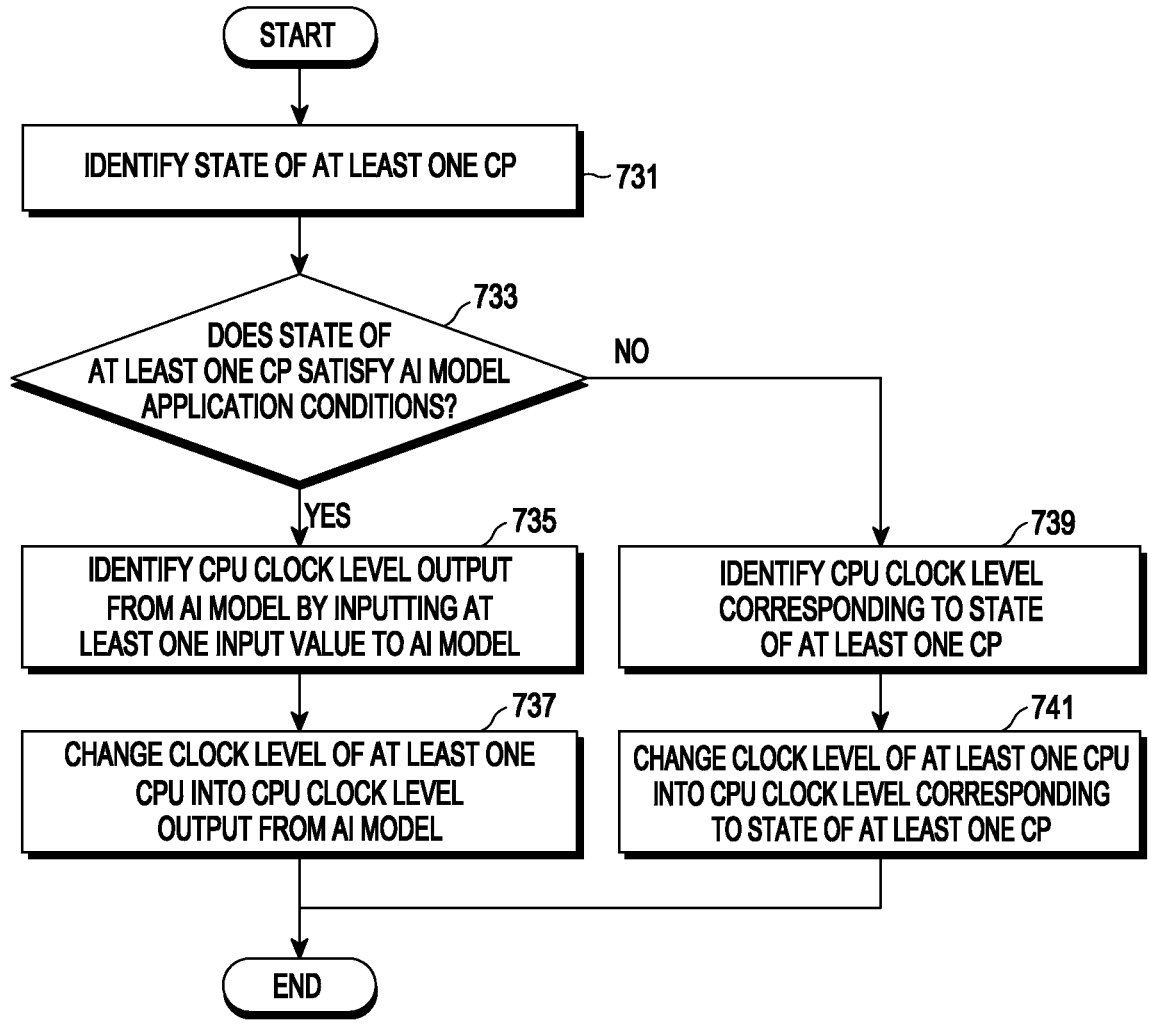
FIG. 7B is a flowchart illustrating an operation method of an electronic device according to an embodiment.

FIG. 7B is a flowchart illustrating an operation method of an electronic device according to an embodiment.

According to an embodiment, an electronic device 101 (e.g., at least one of the processor 120 in FIG. 1, the first communication processor 212 in FIG. 2A, the second communication processor 214 in FIG. 2A, the integrated communication processor 260 in FIG. 2B, or the communication processor 400) may identify the state of at least one communication processor in operation 731. In operation 733, the electronic device 101 may identify whether or not the state of at least one communication processor satisfies AI model application conditions. In an example, if the state of the communication processor performs carrier aggregation (CA) and/or does not perform dual connectivity (DC), the AI model may be configured not to be applied. In an example, if the type of an established packet data unit (PDU) session is ultra-reliable low latency communications (URLLC), the AI model may be configured not to be applied. In an example, it may be configured such that the AI model is applied to the RRC_Connected state and such that the AI model is not applied to the DRX state. Meanwhile, the above-described examples are merely exemplary, and the AI model application conditions related to the state of the communication processor are not limited. If the AI model application conditions are satisfied (YES in 733), the electronic device 101 may input at least one input value to the AI model to identify a CPU clock level output from the AI model in operation 735. For example, the electronic device 101 may input at least one input value to a single AI model used when the AI model application conditions are satisfied. For example, as described with reference to FIG. 6A, the electronic device 101 may select the AI model, based on the state of at least one communication processor, and input at least one input value to the selected AI model. For example, as described with reference to FIG. 6E, the electronic device 101 may select the AI model, based on the state of the electronic device, and input at least one input value to the selected AI model. In operation 737, the electronic device 101 may change the clock level of at least one CPU into the CPU clock level output from the AI model. If the AI model application conditions are not satisfied (NO in 733), the electronic device 101 may identify a CPU clock level corresponding to the state of at least one communication processor in operation 739. For example, the electronic device 101 may identify a CPU clock level corresponding to the state of at least one communication processor, based on the correlation information shown in Table 1. In operation 741, the electronic device 101 may change the clock level of at least one CPU into the CPU clock level corresponding to the state of at least one communication processor.

For example, as shown in the embodiment in FIG. 5A, in the case where the electronic device 101 primarily controls the CPU clock level, based on the correlation information shown in Table 1, and secondarily controls the CPU clock level, based on the AI model, the electronic device 101 may further control the CPU clock level secondarily, based on the AI model, if the state of the communication processor satisfies the AI model application conditions. For example, if the state of the communication processor does not satisfy the AI model application conditions, the electronic device 101 may perform control of the CPU clock level, based on the correlation information shown in Table 1, and may avoid further secondary adjustment of the CPU clock level based on the AI model. Meanwhile, this is merely exemplary, and those skilled in the art will understand that the electronic device 101 may perform the primary CPU clock level control based on the correlation information shown in Table 1 and the secondary CPU clock level control based on the AI model as described in FIG. 5A, instead of determining whether or not the AI model application conditions are satisfied.

For example, the electronic device 101 may selectively perform any one of the CPU clock level control based on the correlation information shown in Table 1 and the CPU clock level control based on the AI model according to the state of the communication processor as described in FIG. 7B, instead of performing the primary CPU clock level control based on the correlation information shown in Table 1 and the secondary CPU clock level control based on the AI model. Those skilled in the art will understand that, depending on the state of the communication processor, the CPU clock level control based on the AI model may be performed first, and then the CPU clock level control based on the correlation information shown in Table 1 may be performed, and vice versa.

Figure 8:
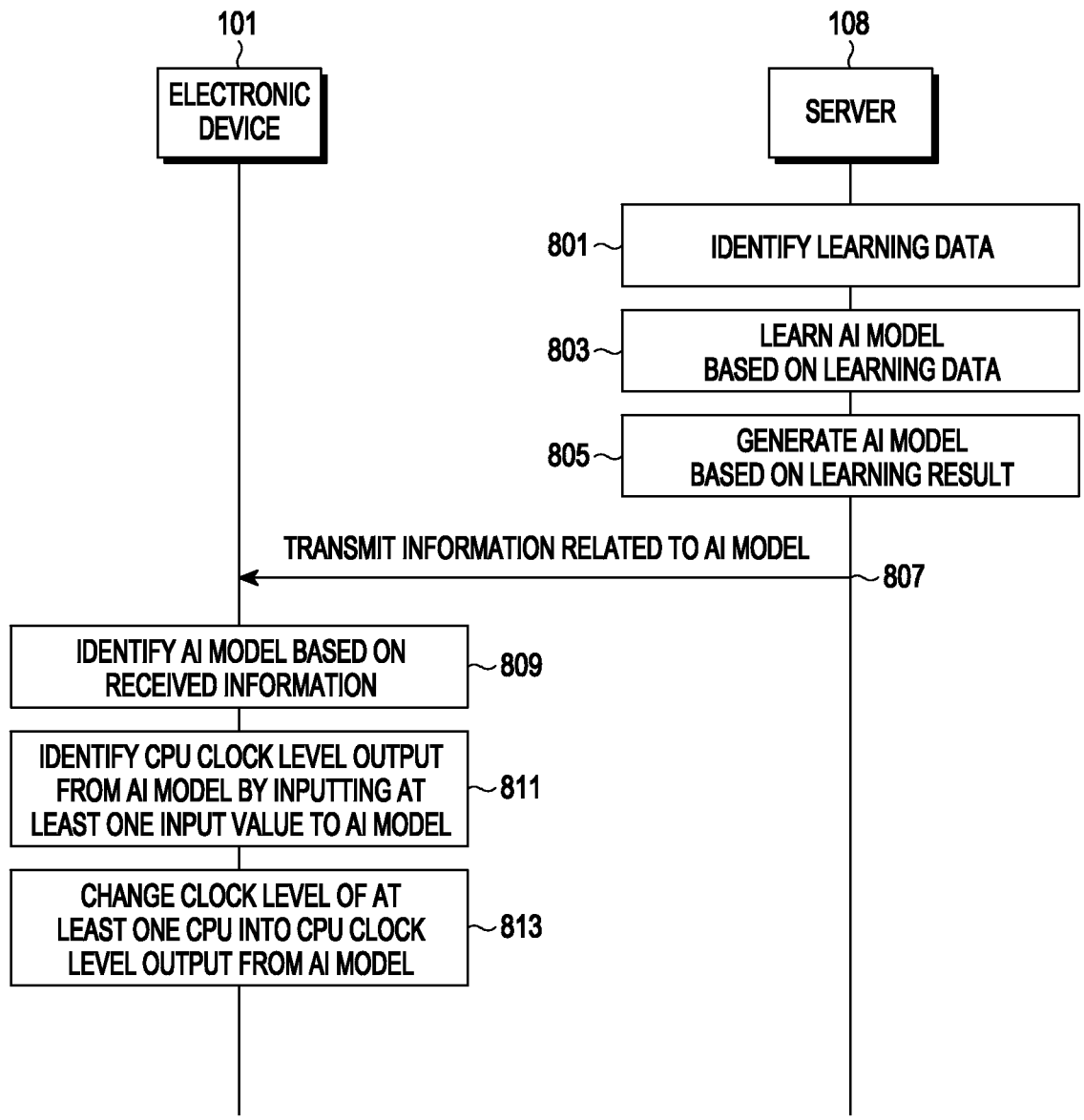
FIG. 8 is a diagram illustrating an operation method of an electronic device and a server according to an embodiment.

FIG. 8 is a diagram illustrates operation methods of an electronic device and a server according to an embodiment. Meanwhile, according to an embodiment, at least some of the operations by the server 108 may be performed by the electronic device 101.

According to an embodiment, the server 108 may identify training data in operation 801. The server 108 is not limited as long as it is a device including at least one computing device, and may be referred to as an AI model generating device, an AI model management device, an AI model transmission device, or the like, which is not limited as long as it represents generation, management, and/or transmission of the AI model. For example, training data may be input and/or transferred to the server 108, and/or the server 108 may generate training data. The server 108 may make an AI model learn, based on training data in operation 803. The server 108 may generate an AI model, based on a training result in operation 805. For example, the server 108 may identify training data corresponding to the AI model. If input values of the AI model are three utilizations including utilization of the first CPU 411, utilization of the second CPU 412, and utilization of the third CPU 413 in FIG. 4 and three pieces of bus traffic including the CPU bus traffic, the data bus traffic, and/or the DMA bus traffic, and if an output value is a CPU clock level, training data shown in Table 5 may be identified and/or used by the server 108.

TABLE 5

| Input values of training data | Output values of training data |
|---|---|
| Utilization for each of CPUs 411, 412, and 413: a1 (core#1), b1 (core#2), and c1 (core#3), CPU bus traffic: d1 Data bus traffic: e1 DMA bus traffic: f1 | Step 1 |
| Utilization for each of CPUs 411, 412, | Step 3 |

TABLE 5-continued

| Input values of training data | Output values of training data |
|---|---|
| and 413: a2 (core#1), b2 (core#2), and c2 (core#3), CPU bus traffic: d2 Data bus traffic: e2 DMA bus traffic: f2 | |

As shown in Table 5, training data may be generated according to input values and output values of the AI model. For example, an embodiment of generating training data shown in Table 5 will be described with reference to FIG. 9. The server 108 may make the AI model learn based on training data. In an example, the server 108 may make the AI model, shown in FIG. 6B, learn, and a mean square error (MSE) may be used as a loss function, and Adam may be used as an optimization function. In an example, the server 108 may make the AI model, shown in FIG. 6C, learn, and Categorical_Crossentropy may be used as a loss function, and Adam may be used as an optimization function, but the above-described loss function and/or optimization function are merely exemplary. In operation 807, the server 108 may transmit information related to the AI model to the electronic device 101.

According to an embodiment, the electronic device 101 may identify an AI model, based on the received information. For example, the electronic device 101 may receive information constituting the AI model from the server 108 and identify an AI model, based on this. For example, the electronic device 101 may receive weights and/or biases related to the NN structure from the server 108 while the NN structure is stored and identify an AI model, based on the received information, and the information that the electronic device 101 may receive from the server 108 for configuration (or identification) of the AI model is not limited. If the AI model is updated in the server 108 afterwards, the electronic device 101 may receive the updated information. In operation 811, the electronic device 101 may input at least one input value to the AI model to identify a CPU clock level output from the AI model. In operation 813, the electronic device 101 may change the clock level of at least one CPU from the AI model to the output CPU clock level.

In an embodiment, as described with reference to FIG. 8, the electronic device 101 may receive information related to the AI model from the server 108 online, or the electronic device 101 may receive an input of information related to the AI model stored in other devices (a PC or a storage device) offline. For example, the PC may generate (or identify) an AI model, based on collected training data. The PC may provide (e.g., provide through a wired interface, not limited thereto) the electronic device 101 with information related to the AI model (e.g., weights, biases, and/or information related to the structure of the AI model, not limited thereto) in the form of a file or source code. Alternatively, a manager may copy information related to the AI model (e.g., weights, biases, and/or information related to the structure of the AI model, not limited thereto) to a storage medium and then connect the storage medium to the electronic device 101, and the electronic device 101 may obtain information (e.g., weights, biases, and/or information related to the structure of the AI model, not limited thereto) related to the AI model from the storage medium. The related information received may be used by, for example, a neural network processing device, but the disclosure is not limited thereto. Those skilled in the art will understand that there is no limit in a path (or method) through which the electronic device 101 receives information (e.g., weights, biases, and/or information related to the structure of the AI model, not limited thereto) related to the AI model.

Although it has been described in various embodiments of the disclosure that the electronic device 101 stores the AI model and identifies the CPU clock level using the stored AI model, this is merely exemplary. In an embodiment, the AI model may be used by the server 108, and the AI model may not be stored in the electronic device 101. In this case, the electronic device 101 may transmit input values of the AI model (e.g., at least one CPU utilization and/or at least one traffic measured at the current time) to the server 108. The server 108 may input the received input values (e.g., at least one CPU utilization and/or at least one traffic measured at the current time) to the AI model. The server 108 may transmit the CPU clock level output from the AI model to the electronic device 101. The electronic device 101 may control the CPU clock level to the received CPU clock level. Those skilled in the art will understand that at least some of the operations of the electronic device 101 in relation to the AI model, described in various embodiments of the disclosure, may also be performed by the server 108.

Figure 9:
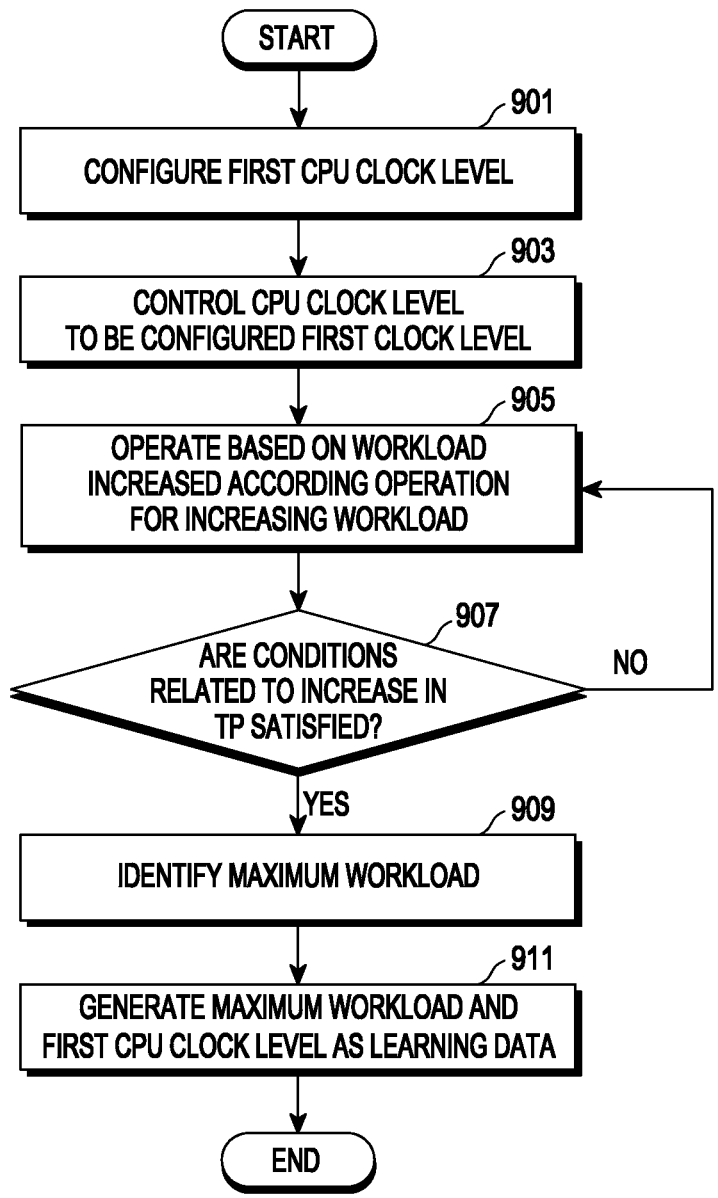
FIG. 9 is a flowchart illustrating an operation method of a training data generating device according to an embodiment.

FIG. 9 is a flowchart illustrating an operation method of a training data generating device according to an embodiment. Meanwhile, according to an embodiment, at least part of the operation method of the electronic device 101 may be performed by the server 108 (or a simulator for the electronic device 101 executed by the server 108). Meanwhile, learning methods may include various types of learning methods including unsupervised learning and reinforcement learning, as well as supervised learning, and the learning methods are not limited. For example, if the reinforcement learning is selected and if the CPU clock level is controlled according to an output value of an AI model based on a workload, reinforcement learning of the AI model may be performed based on the reward corresponding to a corresponding CPU clock level. Herein, the reward may be configured based on whether or not the TP is reduced and/or whether or not performance further deteriorates after the CPU clock level control.

According to an embodiment, the electronic device 101 (e.g., at least one of the processor 120 in FIG. 1, the first communication processor 212 in FIG. 2A, the second communication processor 214 in FIG. 2A, the integrated communication processor 260 in FIG. 2B, or the communication processor 400) may configure a first clock level in operation 901. In operation 903, the electronic device 101 may control the CPU clock level to be the configured first clock level. The electronic device 101, in operation 905, may operate based on a workload increased according to at least one operation for increasing the workload. For example, at least one operation for increasing the workload may be increasing the size of downlink data to the electronic device 101 (e.g., a gradual increase but not limited thereto). According to an increase in the size of downlink data, the electronic device 101 may use more resources for processing downlink data and operate based on the increased workload according thereto. For example, at least one operation for increasing the workload may be increasing the size of uplink data from the electronic device 101 (e.g., a gradual increase but not limited thereto). According to an increase in the size of uplink data, the electronic device 101 may use more resources for processing uplink data and operate based on the increased workload according thereto. Meanwhile, the operation for increasing the workload is not limited and may be an operation capable of primarily performed by the electronic device 101, such as increasing the size of uplink data, and/or an operation capable of primarily performed by the network, such as increasing the size of downlink data.

According to an embodiment, in operation 907, the electronic device 101 may identify whether or not conditions related to an increase in the throughput are satisfied. For example, the electronic device 101 may identify whether or not an increase in the throughput is stopped as to whether or not the conditions related to an increase in the throughput are satisfied. For example, the electronic device 101 may identify whether or not the increase size of the throughput is less than or equal to a threshold size as to whether or not the conditions related to an increase in the throughput are satisfied. For example, the electronic device 101 may identify whether or not the increase rate of the throughput is less than or equal to a threshold increase rate as to whether or not the conditions related to an increase in the throughput are satisfied. Meanwhile, the conditions related to an increase in the throughput are merely exemplary and are not limited as long as the throughput does not increase and/or the increase size is relatively small even when the size of downlink data (or uplink data) is increased. The above-described conditions related to an increase in the throughput may include, for example, whether or not the electronic device 101 is turned off (or it may also be expressed as occurrence of a crash). If the conditions related to an increase in the throughput is not satisfied (NO in 907), the electronic device 101 may operate based on the workload increased according to the operation for increasing the workload, as in operation 905. For example, if it is identified that the conditions related to an increase in the throughput are not satisfied, the network may be further controlled to increase the size of downlink data. The network, for example, may be controlled to gradually increase the size of downlink data until the conditions related to an increase in the throughput are satisfied. According to the above-described process, the electronic device 101 may process downlink data of which the size is gradually increasing, and accordingly, and accordingly, the workload (e.g., three utilizations including utilization of the first CPU 411, utilization of the second CPU 412, and utilization of the third CPU 413 in FIG. 4 and three pieces of bus traffic including the CPU bus traffic, the data bus traffic, and/or the DMA bus traffic, not limited thereto) may also increase. If the conditions related to an increase in the throughput are satisfied (YES in 907), the electronic device 101 may identify the maximum workload in operation 909. Herein, the maximum workload may be a workload at the time at which the conditions related to an increase in the throughput are satisfied. In operation 911, the electronic device 101 may generate the maximum workload and the first CPU clock level as training data. For example, the electronic device 101 may generate training data that is the same as at least part of Table 5. First training data in Table 5 may be a pair of "utilization for each of CPUs 411, 412, and 413: a1 (core #1), b1 (core #2), c1 (core #3), CPU bus traffic: d1, data bus traffic: e1, and DMA bus traffic: f1" and "Step 1". Here, the workload "utilization for each of CPUs 411, 412, and 413: a1 (core #1), b1 (core #2), c1 (core #3), CPU bus traffic: d1, data bus traffic: e1, and DMA bus traffic: f1" may be a workload (e.g., the workload in the case where the throughput no longer increases and/or where the increase size (or increase rate) is relatively small) identified at the time at which the conditions related to an increase in the throughput are satisfied. "Step 1" may be, for example, the CPU clock level configured in operation 901. For example, in order to obtain training data including a pair of "utilization for each of CPU 411, 412, and 413: a2 (core #1), b2 (core #2), c2 (core #3), CPU bus traffic: d2, data bus traffic:

e2, and DMA bus traffic: f2" and "Step 3" in Table 5, the electronic device 101 may fix the CPU clock level in operation 901 to "step 3". Afterwards, the size of downlink data from the network may be increased, and the electronic device 101 may identify a workload of "utilization for each of CPU 411, 412, and 413: a2 (core #1), b2 (core #2), c2 (core #3), CPU bus traffic: d2, data bus traffic: e2, and DMA bus traffic: f2", and accordingly, generate training data as the second item of Table 5. Meanwhile, although it is described that Table 5 includes one piece of training data corresponding to step 1 and one piece of training data corresponding to step 3, this is merely exemplary, and those skilled in the art will understand that enough training data may be obtained for training of the AI model in each step.

Meanwhile, the generation of training data involving a network (or an experimental device that simulates the network), such as a gradual increase in the size of downlink data, is merely exemplary, and those skilled in the art will understand that the generation of training data (e.g., method of identifying the maximum workload, based on artificially increasing the size of uplink data after fixing the CPU clock level, not limited thereto) not involving a network (or an experimental device that simulates the network) is possible.

According to an embodiment, an electronic device 101 may include at least one communication processor (120 in FIG. 1, 212 in FIG. 2A, 214 in FIG. 2A, 260 in FIG. 2B, or 400 in FIG. 4) comprising at least one central processing unit (CPU).

According to an embodiment, the at least one communication processor (120 in FIG. 1, 212 in FIG. 2A, 214 in FIG. 2A, 260 in FIG. 2B, or 400 in FIG. 4) may be configured to enter an RRC_Connected state.

According to an embodiment, the at least one communication processor (120 in FIG. 1, 212 in FIG. 2A, 214 in FIG. 2A, 260 in FIG. 2B, or 400 in FIG. 4) may be configured to control a clock level for the at least one CPU 411, 412, 413, 414, 415, 416, 417, or 418 to be a first CPU clock level corresponding to the RRC_Connected state.

According to an embodiment, the at least one communication processor (120 in FIG. 1, 212 in FIG. 2A, 214 in FIG. 2A, 260 in FIG. 2B, or 400 in FIG. 4) may be configured to identify workload information comprising at least one of utilization information of the at least one CPU 411, 412, 413, 414, 415, 416, 417, or 418 and traffic information of at least one bus of the at least one communication processor (120 in FIG. 1, 212 in FIG. 2A, 214 in FIG. 2A, 260 in FIG. 2B, or 400 in FIG. 4).

According to an embodiment, the at least one communication processor (120 in FIG. 1, 212 in FIG. 2A, 214 in FIG. 2A, 260 in FIG. 2B, or 400 in FIG. 4) may be configured to provide the workload information as an input to an artificial intelligence (AI) model, wherein the AI model is trained using training data comprising at least one of CPU utilization information and bus traffic information as input values and CPU clock levels as output values.

According to an embodiment, the at least one communication processor (120 in FIG. 1, 212 in FIG. 2A, 214 in FIG. 2A, 260 in FIG. 2B, or 400 in FIG. 4) may be configured to identify, based on the providing the workload information as the input to the AI model, a second CPU clock level as an output of the AI model.

According to an embodiment, the at least one communication processor (120 in FIG. 1, 212 in FIG. 2A, 214 in FIG. 2A, 260 in FIG. 2B, or 400 in FIG. 4) may be configured to change the clock level for the at least one CPU 411, 412, 413, 414, 415, 416, 417, or 418 from the first CPU clock level to the second CPU clock level.

According to an embodiment, the utilization information of the at least one CPU comprises utilization information of a first part of the at least one CPU 411, 412, 413, 414, 415, 416, 417, or 418 included in the at least one communication processor (120 in FIG. 1, 212 in FIG. 2A, 214 in FIG. 2A, 260 in FIG. 2B, or 400 in FIG. 4).

According to an embodiment, the first part of the at least one CPU 411, 412, 413, 414, 415, 416, 417, or 418 may comprises a CPU configured to be consistently turned on independent of an operation of the at least one communication processor (120 in FIG. 1, 212 in FIG. 2A, 214 in FIG. 2A, 260 in FIG. 2B, or 400 in FIG. 4).

According to an embodiment, the traffic information of the at least one bus of the at least one communication processor comprises at least one of traffic information of a CPU bus of the at least one communication processor, traffic information of a data bus of the at least one communication processor, and traffic information of a DMA bus of the at least one communication processor (120 in FIG. 1, 212 in FIG. 2A, 214 in FIG. 2A, 260 in FIG. 2B, or 400 in FIG. 4).

According to an embodiment, the at least one communication processor (120 in FIG. 1, 212 in FIG. 2A, 214 in FIG. 2A, 260 in FIG. 2B, or 400 in FIG. 4) may be configured to identify a throughput of the electronic device 101.

According to an embodiment, the at least one communication processor (120 in FIG. 1, 212 in FIG. 2A, 214 in FIG. 2A, 260 in FIG. 2B, or 400 in FIG. 4) may be configured to identify the first CPU clock level based on the identified throughput.

According to an embodiment, the at least one communication processor (120 in FIG. 1, 212 in FIG. 2A, 214 in FIG. 2A, 260 in FIG. 2B, or 400 in FIG. 4), may be configured to select the AI model based on at least one of a state of the at least one communication processor (120 in FIG. 1, 212 in FIG. 2A, 214 in FIG. 2A, 260 in FIG. 2B, or 400 in FIG. 4) and a state of the electronic device 101.

According to an embodiment, the at least one communication processor (120 in FIG. 1, 212 in FIG. 2A, 214 in FIG. 2A, 260 in FIG. 2B, or 400 in FIG. 4) may be configured to identify the second CPU clock level as the output of the AI model, based on a state of the at least one communication processor (120 in FIG. 1, 212 in FIG. 2A, 214 in FIG. 2A, 260 in FIG. 2B, or 400 in FIG. 4) or a state of the electronic device 101 satisfying an AI model application condition.

According to an embodiment, the AI model application condition may be associated with at least one of a measurement value of at least one piece of hardware of the electronic device 101 and execution of an application by the electronic device 101.

According to an embodiment, the at least one communication processor (120 in FIG. 1, 212 in FIG. 2A, 214 in FIG. 2A, 260 in FIG. 2B, or 400 in FIG. 4), may be configured to maintain the first CPU clock level, based on the state of the at least one communication processor (120 in FIG. 1, 212 in FIG. 2A, 214 in FIG. 2A, 260 in FIG. 2B, or 400 in FIG. 4) or the state of the electronic device 101 not satisfying the AI model application condition.

According to an embodiment, an operation method of an electronic device 101 may include entering an RRC_Connected state.

According to an embodiment, the operation method of an electronic device 101 may include controlling the clock level for at least one CPU 411, 412, 413, 414, 415, 416, 417, or 418 included in at least one communication processor (120 in FIG. 1, 212 in FIG. 2A, 214 in FIG. 2A, 260 in FIG.

2B, or 400 in FIG. 4) of the electronic device to be a first CPU clock level corresponding to the RRC_Connected state.

According to an embodiment, the operation method of an electronic device 101 may include identifying workload information comprising at least one of utilization information of the at least one CPU 411, 412, 413, 414, 415, 416, 417, or 418 and traffic information of at least one bus of the at least one communication processor (120 in FIG. 1, 212 in FIG. 2A, 214 in FIG. 2A, 260 in FIG. 2B, or 400 in FIG. 4).

According to an embodiment, the operation method of an electronic device 101 may include providing the workload information as an input to an artificial intelligence (AI) model, wherein the AI model is trained using training data comprising at least one of CPU utilization information and bus traffic information as input values and CPU clock levels as output values.

According to an embodiment, the operation method of an electronic device 101 may include identifying, based on the providing the workload information as the input to the AI model, a second CPU clock level as an output of the AI model.

According to an embodiment, the operation method of an electronic device 101 may include changing the clock level for the at least one CPU 411, 412, 413, 414, 415, 416, 417, or 418 from the first CPU clock level to the second CPU clock level.

According to an embodiment, the utilization information of the at least one CPU comprises utilization information of a first part of the at least one CPU (411, 412, 413, 414, 415, 416, 417, or 418).

According to an embodiment, the first part of the at least one CPU 411, 412, 413, 414, 415, 416, 417, or 418 may comprise a CPU configured to be consistently turned on independent of an operation of the at least one communication processor (120 in FIG. 1, 212 in FIG. 2A, 214 in FIG. 2A, 260 in FIG. 2B, or 400 in FIG. 4).

According to an embodiment, the traffic information of the at least one bus of the at least one communication processor comprises traffic information of a CPU bus of the at least one communication processor, traffic information of a data bus of the at least one communication processor, and traffic information of a DMA bus of the at least one communication processor (120 in FIG. 1, 212 in FIG. 2A, 214 in FIG. 2A, 260 in FIG. 2B, or 400 in FIG. 4).

According to an embodiment, the operation method of an electronic device 101 may include identifying a throughput of the electronic device 101.

According to an embodiment, the operation method of an electronic device 101 may include identifying the first CPU clock level based on the identified throughput.

According to an embodiment, the operation method of an electronic device 101 may include selecting the AI model based on at least one of a state of the at least one communication processor (120 in FIG. 1, 212 in FIG. 2A, 214 in FIG. 2A, 260 in FIG. 2B, or 400 in FIG. 4) and a state of the electronic device 101.

According to an embodiment, the operation method of an electronic device 101 may include identifying the second CPU clock level as the output of the AI model, based on a state of the at least one communication processor (120 in FIG. 1, 212 in FIG. 2A, 214 in FIG. 2A, 260 in FIG. 2B, or 400 in FIG. 4) or a state of the electronic device 101 satisfying an AI model application condition.

According to an embodiment, the AI model application condition may comprise a measurement value of at least one piece of hardware of the electronic device 101 or execution of an application by the electronic device 101.

According to an embodiment, the operation method of an electronic device 101 may include maintaining the first CPU clock level, based on the state of the at least one communication processor (120 in FIG. 1, 212 in FIG. 2A, 214 in FIG. 2A, 260 in FIG. 2B, or 400 in FIG. 4) or the state of the electronic device 101 not satisfying the AI model application condition.

According to an embodiment, a non-transitory computer readable medium having instructions stored therein may be provided. The instructions may cause, when executed by at least one communication processor (120 in FIG. 1, 212 in FIG. 2A, 214 in FIG. 2A, 260 in FIG. 2B, or 400 in FIG. 4) of an electronic device 101, the electronic device 101 to execute a method of operating the electronic device.

According to an embodiment, the at least one operation may include entering an RRC_Connected state.

According to an embodiment, the at least one operation may include controlling a clock level for at least one CPU 411, 412, 413, 414, 415, 416, 417, or 418 included in the at least one communication processor (120 in FIG. 1, 212 in FIG. 2A, 214 in FIG. 2A, 260 in FIG. 2B, or 400 in FIG. 4) to be a first CPU clock level corresponding to the RRC-_Connected state.

According to an embodiment, the at least one operation may include identifying workload information comprising utilization information of the at least one CPU 411, 412, 413, 414, 415, 416, 417, or 418 and traffic information of at least one bus of the at least one communication processor (120 in FIG. 1, 212 in FIG. 2A, 214 in FIG. 2A, 260 in FIG. 2B, or 400 in FIG. 4).

According to an embodiment, the at least one operation may include providing the workload information as an input to an artificial intelligence (AI) model, wherein the AI model is trained using training data comprising at least one of CPU utilization information and bus traffic information as input values and CPU clock levels as output values According to an embodiment, the at least one operation may include identifying, based on the providing the workload information as the input to the AI model, a second CPU clock level as an output of the AI model.

According to an embodiment, the at least one operation may include changing the clock level for the at least one CPU 411, 412, 413, 414, 415, 416, 417, or 418 from the first CPU clock level to the second CPU clock level.

According to an embodiment, the utilization information of the at least one CPU comprises utilization information of a first part of the at least one CPU (411, 412, 413, 414, 415, 416, 417, or 418).

According to an embodiment, the first part of the at least one CPU 411, 412, 413, 414, 415, 416, 417, or 418 may comprise a CPU configured to be consistently turned on independent of an operation of the at least one communication processor (120 in FIG. 1, 212 in FIG. 2A, 214 in FIG. 2A, 260 in FIG. 2B, or 400 in FIG. 4).

According to an embodiment, the traffic information of the at least one bus of the at least one communication processor comprises traffic information of a CPU bus of the at least one communication processor, traffic information of a data bus of the at least one communication processor, and traffic information of a DMA bus of the at least one communication processor (120 in FIG. 1, 212 in FIG. 2A, 214 in FIG. 2A, 260 in FIG. 2B, or 400 in FIG. 4).

According to an embodiment, the at least one operation may include identifying a throughput of the electronic device 101.

According to an embodiment, the at least one operation may include identifying the first CPU clock level based on the identified throughput.

According to an embodiment, the at least one operation may include selecting the AI model based on at least one of a state of the at least one communication processor (120 in FIG. 1, 212 in FIG. 2A, 214 in FIG. 2A, 260 in FIG. 2B, or 400 in FIG. 4) and a state of the electronic device 101.

According to an embodiment, the at least one operation may include identifying the second CPU clock level as the output of the AI model, based on a state of the at least one communication processor (120 in FIG. 1, 212 in FIG. 2A, 214 in FIG. 2A, 260 in FIG. 2B, or 400 in FIG. 4) or a state of the electronic device 101 satisfying an AI model application condition.

According to an embodiment, the at least one operation may include maintaining the first CPU clock level, based on the state of the at least one communication processor (120 in FIG. 1, 212 in FIG. 2A, 214 in FIG. 2A, 260 in FIG. 2B, or 400 in FIG. 4) or the state of the electronic device 101 not satisfying the AI model application condition.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    memory storing one or more computer programs; and
    at least one communication processor comprising at least one central processing unit (CPU),
    wherein the one or more computer programs include computer-executable instructions that, when executed by the at least one communication processor individually or collectively, cause the electronic device to:

enter an RRC_Connected state;
select an artificial intelligence (AI) model based on whether the AI model satisfies a first condition related to an application;
control a clock level for the at least one CPU to be a first CPU clock level based on a state of the at least one communication processor or the AI model;
identify workload information comprising at least one of utilization information of the at least one CPU and traffic information of at least one bus of the at least one communication processor;
identify a maximum workload based on the first CPU clock level and whether a second condition related to an increase in a throughput is satisfied;
generate the workload information comprising the maximum workload and the first CPU clock level;
provide the workload information as an input to the AI model, wherein the AI model is trained using training data comprising at least one of CPU utilization information and bus traffic information as input values and CPU clock levels as output values;
identify, based on the providing the workload information as the input to the AI model, a second CPU clock level as an output of the AI model; and
change the clock level for the at least one CPU from the first CPU clock level to the second CPU clock level.

2. The electronic device of claim 1, wherein the utilization information of the at least one CPU comprises utilization information of a first part of the at least one CPU.

3. The electronic device of claim 2, wherein the first part of the at least one CPU comprises a CPU configured to be consistently turned on independent of an operation of the at least one communication processor.

4. The electronic device of claim 1, wherein the traffic information of the at least one bus of the at least one communication processor comprises at least one of traffic information of a CPU bus of the at least one communication processor, traffic information of a data bus of the at least one communication processor, and traffic information of a DMA bus of the at least one communication processor.

5. The electronic device of claim 1,
wherein the one or more computer programs include computer-executable instructions that, when executed by the at least one communication processor individually or collectively, cause the electronic device to:
identify the throughput of the electronic device, and
identify the first CPU clock level based on the throughput.

6. The electronic device of claim 1, wherein the AI model is selected further based on at least one of the state of the at least one communication processor and a state of the electronic device.

7. The electronic device of claim 1, wherein the second CPU clock level is identified as the output of the AI model further based on the state of the at least one communication processor or a state of the electronic device satisfying the first condition.

8. The electronic device of claim 7, wherein the first condition is associated with at least one of a measurement value of at least one piece of hardware of the electronic device and execution of the application by the electronic device.

9. A method of operating an electronic device, the method comprising:
entering an RRC_Connected state;
selecting an artificial intelligence (AI) model based on whether the AI model satisfies a first condition related to an application;
controlling a clock level for at least one central processing unit (CPU) included in at least one communication processor of the electronic device to be a first CPU clock level based on a state of the at least one communication processor or the AI model;
identifying workload information comprising at least one of utilization information of the at least one CPU and traffic information of at least one bus of the at least one communication processor;
identifying a maximum workload based on the first CPU clock level and whether a second condition related to an increase in a throughput is satisfied;
generating the workload information comprising the maximum workload and the first CPU clock level;
providing the workload information as an input to the AI model, wherein the AI model is trained using training data comprising at least one of CPU utilization information and bus traffic information as input values and CPU clock levels as output values;
identifying, based on the providing the workload information as the input to the AI model, a second CPU clock level as an output of the AI model; and
changing the clock level for the at least one CPU from the first CPU clock level to the second CPU clock level.

10. The method of claim 9, wherein the utilization information of the at least one CPU comprises utilization information of a first part of the at least one CPU.

11. The method of claim 10, wherein the first part of the at least one CPU comprises a CPU configured to be consistently turned on independent of an operation of the at least one communication processor.

12. The method of claim 9, wherein the traffic information of the at least one bus of the at least one communication processor comprises traffic information of a CPU bus of the at least one communication processor, traffic information of a data bus of the at least one communication processor, and traffic information of a DMA bus of the at least one communication processor.

13. The method of claim 9, further comprising:
identifying the throughput of the electronic device; and
identifying the first CPU clock level based on the throughput.

14. The method of claim 9, wherein the AI model is selected further based on at least one of the state of the at least one communication processor and a state of the electronic device.

15. The method of claim 9, wherein the second CPU clock level is identified as the output of the AI model-based on the state of the at least one communication processor or a state of the electronic device satisfying the first condition.

16. The method of claim 15, wherein the first condition comprises a measurement value of at least one piece of hardware of the electronic device and execution of the application by the electronic device.

17. A non-transitory computer readable medium having instructions stored therein, which when executed by at least one communication processor of an electronic device, cause the electronic device to execute a method of operating the electronic device, the method comprising:

entering an RRC_Connected state;

selecting an artificial intelligence (AI) model based on whether the AI model satisfies a first condition related to an application;

controlling a clock level for at least one central processing unit (CPU) included in at least one communication processor of the electronic device to be a first CPU clock level based on a state of the at least one communication processor or the AI model;

identifying workload information comprising at least one of utilization information of the at least one CPU and traffic information of at least one bus of the at least one communication processor;

identifying a maximum workload based on the first CPU clock level and whether a second condition related to an increase in a throughput is satisfied;

generating the workload information comprising the maximum workload and the first CPU clock level;

providing the workload information as an input to the AI model, wherein the AI model is trained using training data comprising at least one of CPU utilization information and bus traffic information as input values and CPU clock levels as output values;

identifying, based on the providing the workload information as the input to the AI model, a second CPU clock level as an output of the AI model; and changing the clock level for the at least one CPU from the first CPU clock level to the second CPU clock level.

18. The non-transitory computer readable medium of claim 17, wherein the utilization information of the at least one CPU comprises utilization information of a first part of the at least one CPU.

* * * * *